(12) United States Patent
Kubo et al.

(10) Patent No.: US 6,263,070 B1
(45) Date of Patent: *Jul. 17, 2001

(54) TELEPHONE HAVING AN INTERNALLY LIT DISPLAY

(75) Inventors: Hiroshi Kubo; Hidekatsu Kobayashi; Masashi Tomura, all of Sapporo (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/623,957

(22) Filed: Mar. 29, 1996

(30) Foreign Application Priority Data

Sep. 26, 1995 (JP) .................................................. 7-247983

(51) Int. Cl.[7] .................................................... H04M 1/00
(52) U.S. Cl. .......................................... 379/368; 379/433
(58) Field of Search .................................. 379/433, 434, 379/428, 368, 369, 370; 345/74, 76, 45, 47, 102, 170; 341/31; 200/308, 310, 312, 313, 314, 317

(56) References Cited

U.S. PATENT DOCUMENTS

| | | | |
|---|---|---|---|
| 4,532,395 | * 7/1985 | Zukonski | 200/314 |
| 5,418,850 | * 5/1995 | Tanji et al. | 379/428 |
| 5,515,045 | * 5/1996 | Tak | 341/23 |
| 5,570,114 | * 10/1996 | Fowler | 345/45 |
| 5,697,493 | * 12/1997 | Sach et al. | 200/314 |

* cited by examiner

Primary Examiner—Jack Chiang
(74) Attorney, Agent, or Firm—Staas & Halsey LLP

(57) ABSTRACT

A telephone including a case; an operation part, located at a front of the case, having a light transmission property and a plurality of key tops arranged on a front surface thereof; a circuit substrate, provided inside the case and having a sheet-luminescent-member driving circuit; and a sheet luminescent member, provided at a rear of the operation part, between the circuit substrate and the case. Light emitted by the sheet luminescent member fully illuminates each key top from the rear surface thereof.

19 Claims, 26 Drawing Sheets

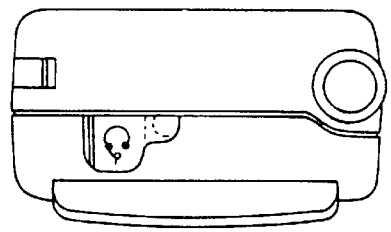
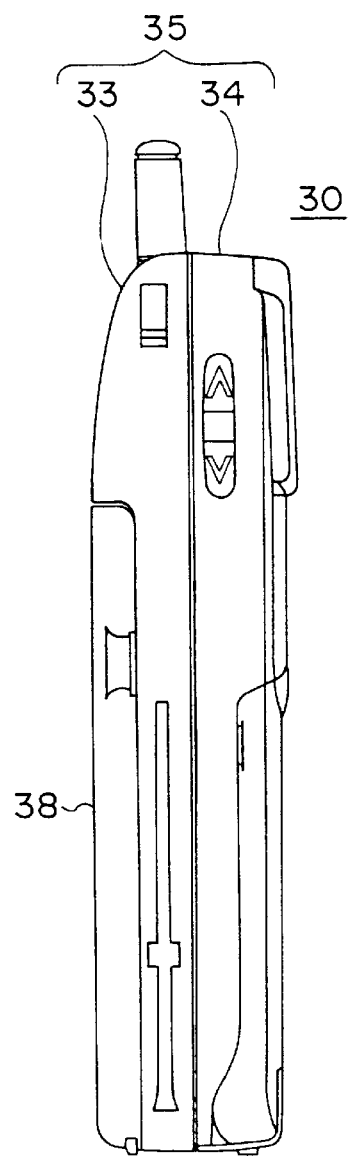
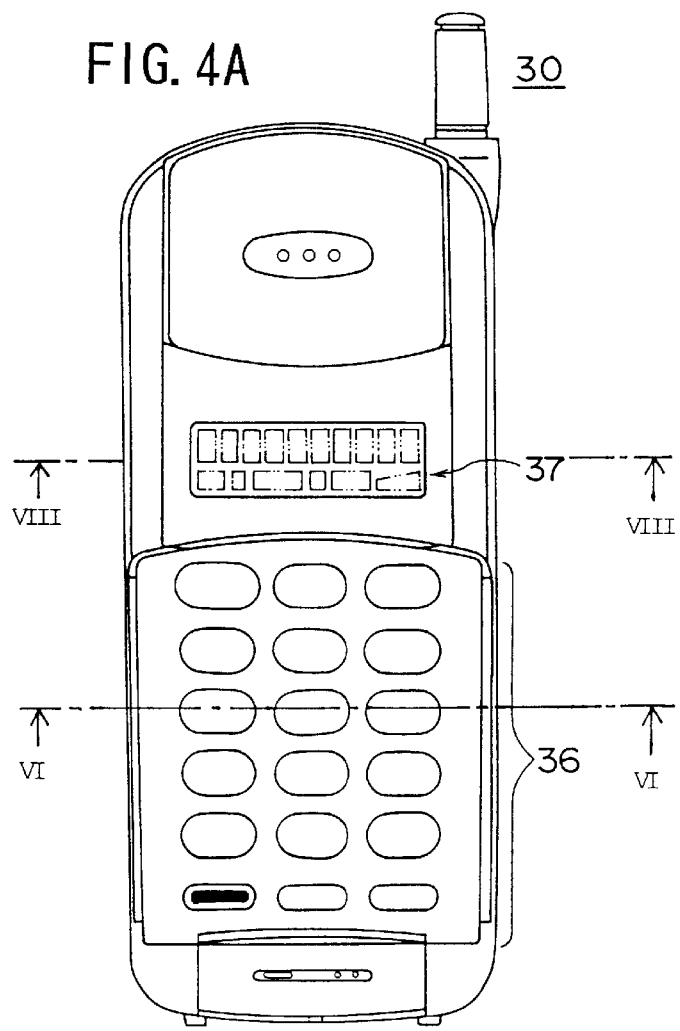

31D

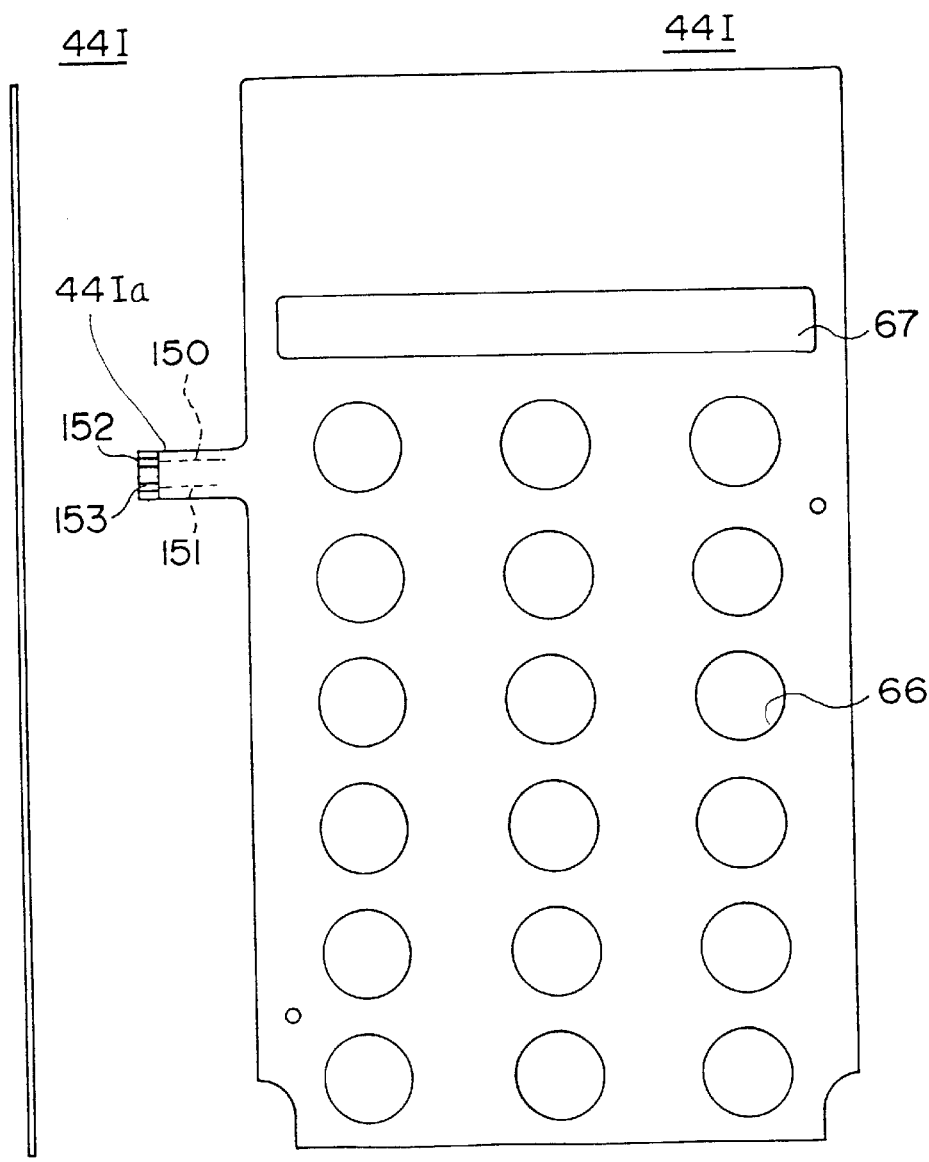

44J

44J

TELEPHONE HAVING AN INTERNALLY LIT DISPLAY

BACKGROUND OF THE INVENTION

1. Field of the Invention

The present invention relates to a telephone and, in particular, to a portable telephone.

In consideration of use at night, a portable telephone has a device for lighting each key of a keypad from the inside of the portable telephone. In order to improve an appearance quality of the portable telephone, it is preferable that the lighting device lights each key uniformly.

2. Description of the Related Art

FIG. 1 shows an example of a telephone in the related art. The portable telephone 10 has a structure in which a telephone body assembly 11 and a keypad 12 are contained in a case assembly 15 which consists of a combination of a rear case assembly 13 and a front case assembly 14.

The telephone body assembly 11 has a plurality of LEDs (Light-Emitting Diodes) 17, each between adjacent key contacts 16. When it is used at night, a button for lighting is pressed, the LEDs 17 emit light, and the light 18 from the LEDs 17 propagates and diffuses as indicated by arrows shown in FIG. 2 in the keypad 12 which is made of a silicon rubber. Thereby, all key tops 19-1, 19-2, 19-3, . . . are lit from the inside.

As seen from FIG. 2, the light from the LEDs 17 approaches each key top from the side of the key. As a result, it is likely that a portion of the key top nearer a respective LED 17 is brighter accordingly. For example, in FIG. 2, the portions 20 are bright while the portions 21 are dim. With regard to the key top 19-2, for example, as shown in a brightness curve X in FIG. 2, the mid portion is dimmest. With regard to the key top 19-1, the left side portion is dark. With regard to the key top 19-3, the right side portion is dark. Thus, unevenness in brightness occurs in each key top and thus an appearance quality is poor.

SUMMARY OF THE INVENTION

An object of the present invention is to provide a telephone in which the above-mentioned problem is solved.

A first telephone according to the present invention, comprises:

a case;

an operation part, located in a front side of the case, having a light transmission property and having a plurality of key tops arranged on a rear surface thereof, each key top comprising a projection for pressing a contact part;

a circuit substrate, provided inside the case and having a sheet-luminescent-member driving circuit; and a sheet luminescent member, sheet-shaped, luminescent on the front surface thereof, having openings formed in positions corresponding to those of the projections and terminals electrically connected with the circuit substrate;

the sheet luminescent member being provided in the rear side of the operation part, between the circuit substrate and the case, where the terminals are electrically connected with the circuit substrate and the openings face the projections respectively;

wherein light emitted by the sheet luminescent member is incident on each key top from the rear surface thereof.

Thereby, it is possible to make uniform brightness through the entirety of the front surface of each key top, in comparison to the case of the related art. As a result, an appearance quality of the telephone, when used at night, can be improved.

Further, the openings of the sheet luminescent member allow the projections of key tops to pass therethrough, and therefore, provision of the sheet luminescent member does not degrade an easy operation condition of the key tops.

A second telephone according to the present invention, comprises:

a case;

an operation part, located in a front side of the case, and having a plurality of key tops arranged thereon;

a liquid crystal display part exposed to the front side of the case;

a circuit substrate, provided inside the case and having a sheet-luminescent-member driving circuit; and a sheet luminescent member, sheet-shaped, luminescent on the front surface thereof, having terminals electrically connected with the circuit substrate;

the sheet luminescent member being provided in the rear side of the operation part, between the circuit substrate and the case, where the terminals are electrically connected with the circuit substrate and the openings face the projections respectively;

wherein light emitted by the sheet luminescent member is incident on the liquid crystal display part from the rear surface thereof.

Thereby, it is possible to make uniform brightness through the entirety of the liquid crystal display part, in comparison to the case of the related art. As a result, an appearance quality of the telephone, when used at night, can be improved.

A third telephone according to the present invention, comprises:

a case;

an operation part, located in a front side of the case, having a light transmission property and having a plurality of key tops arranged thereon, each key top having a projection arranged on the rear surface thereof for pressing a contact part;

a liquid crystal display part exposed to the front side of the case;

a circuit substrate, provided inside the case and having a sheet-luminescent-member driving circuit; and a sheet luminescent member, sheet-shaped, luminescent on the front surface thereof, having terminals electrically connected with the circuit substrate;

the sheet luminescent member being provided in the rear side of the operation part, between the circuit substrate and the case, where the terminals are electrically connected with the circuit substrate and the openings face the projections respectively;

wherein light emitted by the sheet luminescent member is incident on each key top from the rear surface thereof and also to the liquid crystal display part from the rear surface thereof.

Thereby, it is possible to make uniform brightness through the entirety of the front surface of each key top, in comparison to the case of the related art. As a result, an appearance quality of the telephone, when used at night, can be improved.

Further, it is also possible to make uniform brightness through the entirety of the liquid crystal display part, in comparison to the case of the related art. As a result, an appearance quality of the telephone, when used at night, can be improved.

Further, the openings of the sheet luminescent member allow the projections of key tops to pass therethrough, and therefore, provision of the sheet luminescent member does not degrade an easy operation condition of the key tops.

A fourth telephone according to the present invention, comprises:

a case;

an operation part, located in a front side of the case, having a light transmission property and having a plurality of key tops arranged thereon, each key top having a projection arranged on the rear surface thereof for pressing a contact part;

a liquid crystal display part exposed to the front side of the case;

a circuit substrate, provided inside the case and having a sheet-luminescent-member driving circuit; and a sheet luminescent member, sheet-shaped, having standing portions facing two side surfaces of the liquid crystal display part and terminals electrically connected with the circuit substrate, the sheet luminescent member being luminescent on the front surface thereof and also luminescent on surfaces of the standing portions facing the two side surfaces of the liquid crystal display part;

the sheet luminescent member being provided in the rear side of the operation part, between the circuit substrate and the case, where the standing portions face the two side surfaces of the liquid crystal display part, the terminals are electrically connected with the circuit substrate and the openings face the projections respectively;

wherein:

light emitted by the sheet luminescent member is incident on each key top from the rear surface thereof; and light emitted from the surfaces of the standing portions of the sheet luminescent member facing the two side surfaces of the liquid crystal display part is incident on the liquid crystal display part from the two side surfaces.

Thereby, advantages similar to those of the above-described first telephone can also be obtained. Further, because light emitted from the surface of the standing portions of the sheet luminescent member facing the two side surfaces of the liquid crystal display part is incident on the two side surfaces of the liquid crystal display part uniformly through the entirety of the two side surfaces, it is possible to make uniform brightness through the liquid crystal display part, in comparison to the case of the related art. As a result, an appearance quality of the telephone, when used at night, can be improved. Further, according to this method for supplying light to the liquid crystal display part, it is not necessary to increase a thickness of the liquid crystal display part because the sheet luminescent member is not present in the rear side thereof but is present in the lateral sides.

In any of the above-described four telephones, the sheet luminescent member may integrally comprise a metal sheet on the rear surface thereof, the metal sheet having an electrical shielding function. Thereby, it is not necessary to provide a shield member because the metal sheet in the sheet luminescent member acts as the shield member.

In any of the above-described four telephones, the sheet luminescent member may comprise contact domes in the openings. Thereby, it is not necessary to provide a key contact board because the sheet luminescent member also acts as the key contact board.

In any of the above-described four telephones, the sheet luminescent member comprises a metal sheet on the rear surface thereof, the metal sheet having an electrical shielding function; and the sheet luminescent member further comprises contact domes in the openings.

Thereby, it is not necessary to provide a shield member because the metal sheet in the sheet luminescent member acts as the shield member. Further, it is also not necessary to provide a key contact board because the sheet luminescent member also acts as the key contact board.

In any of the above-described four telephones, the sheet luminescent member integrally comprises a flexible printed substrate. Thereby, it is possible to provide a module of the flexible printed board having a plurality of electronic components incorporated thereto.

In any of the above-described four telephones, the sheet luminescent member comprises an arm having an electric terminal at an extending end thereof. As a result, by providing a connector on the circuit substrate, it is possible to electrically connect the sheet luminescent member with the circuit substrate through the arm and connector.

In any of the above-described four telephones, the sheet luminescent member comprises an opening which exposes therethrough an electric terminal of the sheet luminescent member. Thereby, a pressing member such as that made of a rubber is provided and used for pressing the electric terminal onto the circuit substrate via this opening. Thereby, it is possible to electrically connect the sheet luminescent member with the circuit substrate through the electric terminal.

Other objects and further features of the present invention will become more apparent from the following detailed description when read in conjunction with the accompanying drawings.

BRIEF DESCRIPTION OF THE DRAWINGS

FIGS. 4A, 4B and 4C show a front view, a side elevational view and a plan view, respectively, of an external appearance of the portable telephone shown in FIG. 3;

FIGS. 30A and 30B show a front view and a side elevational view of the sheet luminescent member, in a first variant example of the structure thereof in the above-mentioned embodiments of the present invention;

DESCRIPTION OF PREFERRED EMBODIMENTS

Figure 1:
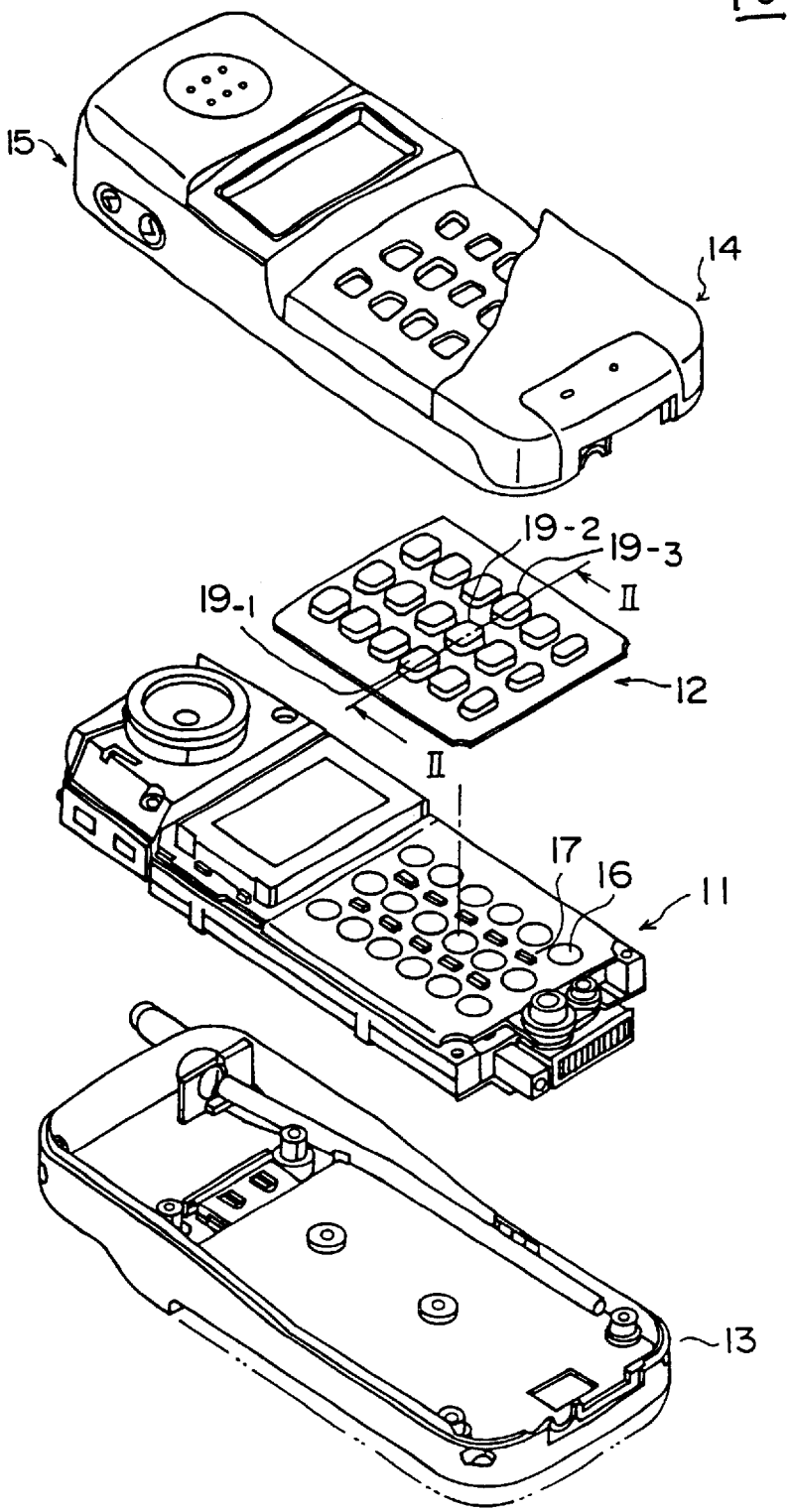
FIG. 1 shows an example of a telephone in the related art.

FIG. 3, 4A, 4B and 4C shows a portable telephone 30 in a first embodiment of the present invention. The portable telephone 30 has a structure in which a telephone body assembly 31 and a keypad 32 are contained in a case assembly 35 (serving as a case) which consists of a rear case assembly 33 and a front case assembly 34. The portable telephone 30 has an operation portion 36 in which a plurality of key tops 32a are arranged so as to form three columns, and a liquid crystal display portion 37, on the front surface of the case assembly 35. The portable telephone 30 is used in a condition in which a battery 38 is loaded in the rear surface thereof.

Figure 3:
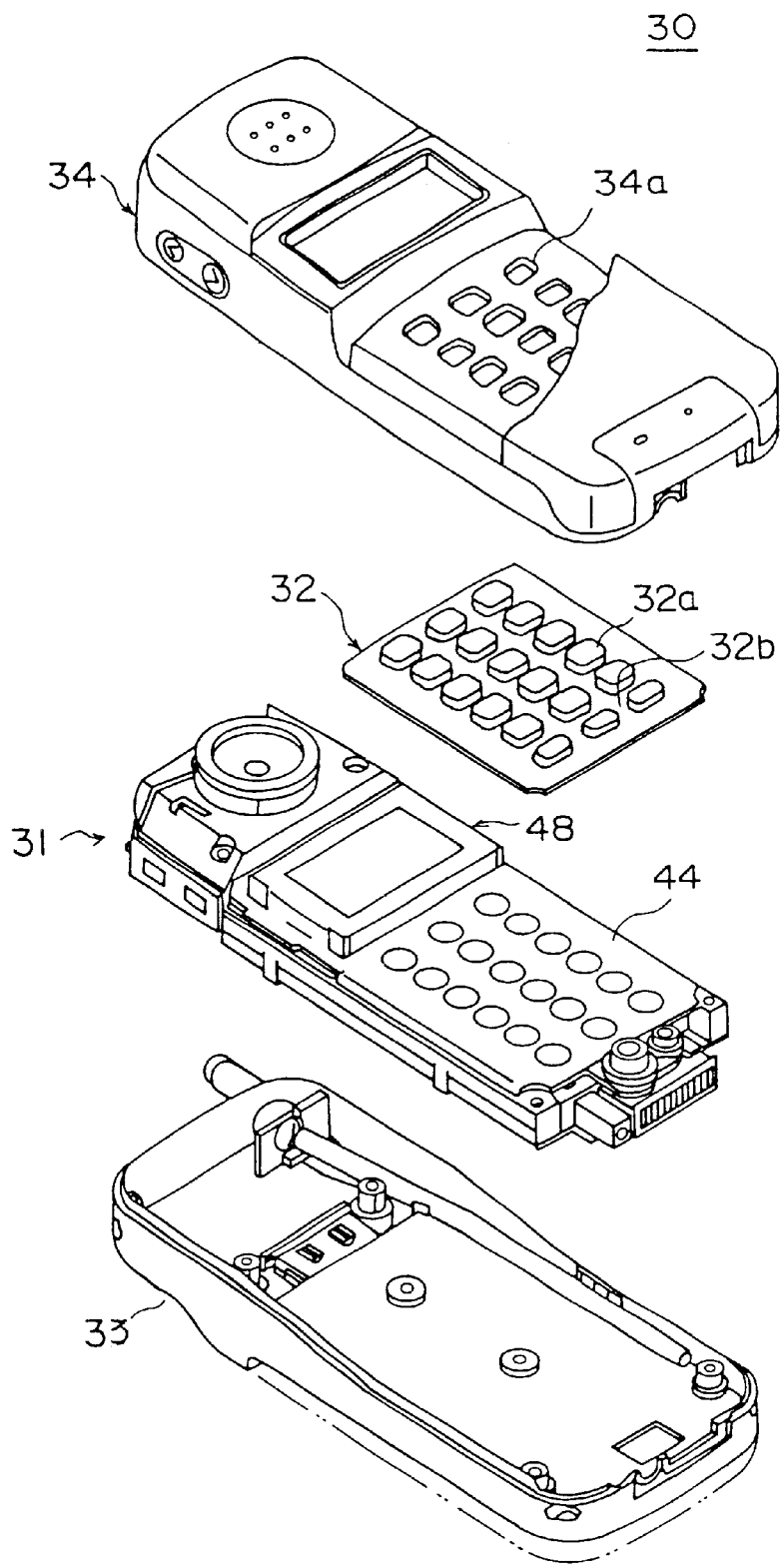
FIG. 3 shows an exploded perspective view of a portable telephone in a first embodiment of the present invention.
Figure 5:
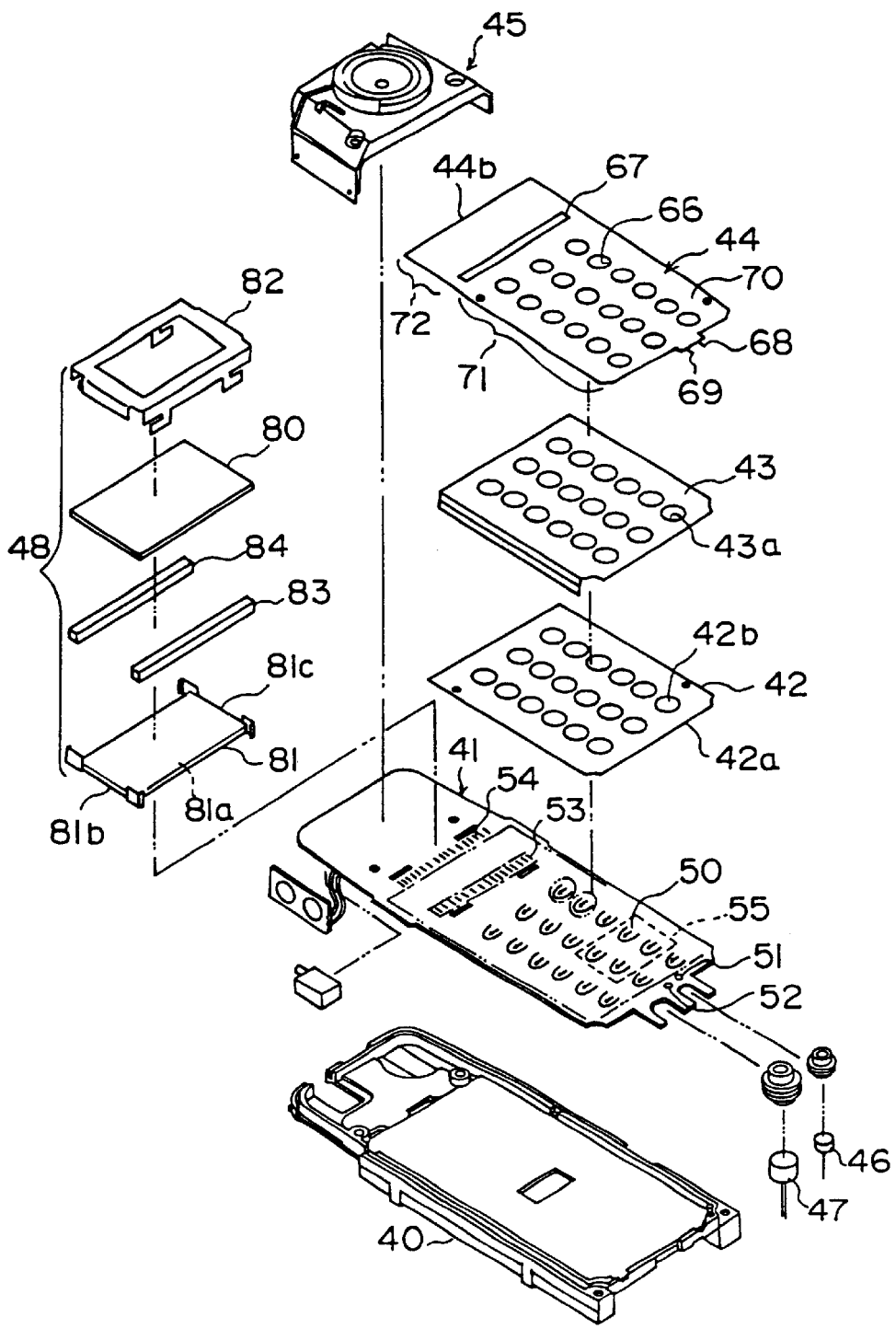
FIG. 5 shows an exploded perspective view of a front half of a telephone body assembly in the portable telephone shown in FIG. 3.

As shown in FIG. 5, the telephone assembly 31 has a structure in which a shield case 40 is a body. As shown in FIGS. 5, 6, 7 and 8, above the shield case 40, a front printed board 41, a key contact board 42, a shield board member 43 and a sheet luminescent member 44 are stacked and mounted to the shield case 40. Further, a speaker assembly 45 is mounted above the shield case 40. A microphone 46 and a buzzer 47 are mounted on the front printed board 41. Further, a liquid crystal display assembly 48 is mounted on the front printed board 41 from the upper side of the sheet luminescent member 44. Further, the keypad 32 shown in FIG. 3 is mounted so as to overlay the sheet luminescent member 44 top surface 70. The key contact board 42 has a structure in which a plurality of contact domes 42b, acting as electric contacts, are mounted so as to be aligned with each other on a body 42a, the contact domes 42b being fixed to the body 42a using a doublesided adhesive tape 42c as shown in FIG. 7. The shield board member 43 has a plurality of openings 43a, which are aligned with the plurality of contact domes 42b respectively.

As shown in FIG. 5, the front printed board 41 has, on the front surface thereof, a plurality of aligned contact terminals 50, two pads 51, 52, and two rows of pad groups 53, 54; and, on the rear surface thereof, a sheet-luminescent-member driving circuit 55. The pads 51, 52 (acting as electric terminals) and the sheet-luminescent-member driving circuit 55 are provided for the sheet luminescent member 44. The sheet-luminescent-member driving circuit 55 supplies an alternating-current electric current. The two rows of pad groups 53, 54 are provided for the liquid crystal display assembly 48.

Figure 9:
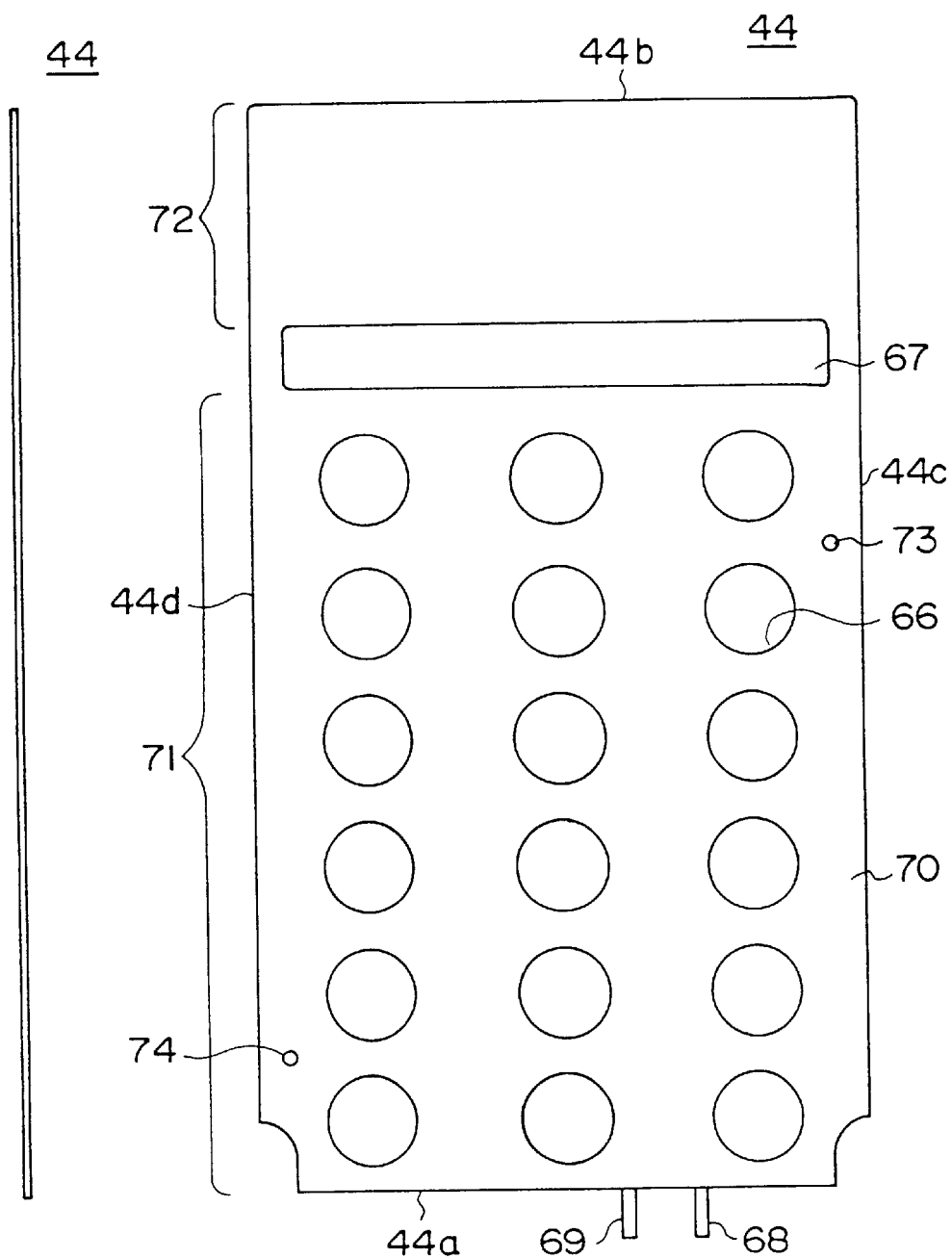
FIGS. 9A and 9B show a front view and a side elevational view of a sheet luminescent member provided in the telephone body assembly shown in FIG. 5.
Figure 10:
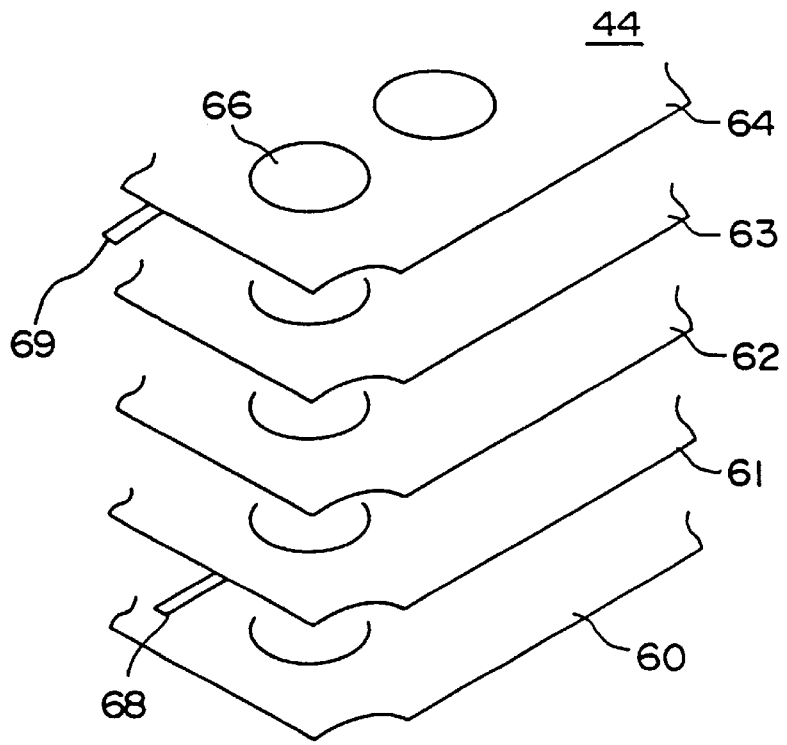
FIG. 10 shows a stack structure of the sheet luminescent member shown in FIGS. 9A and 9B.

The sheet luminescent member 44 is made of an EL (Electroluminescence) lamp. The sheet luminescent member 44 has a structure, as shown in FIGS. 9A, 9B and 10, in which a rear insulation layer 60, a rear electrode layer 61, a dielectric layer 62, a phosphor layer 63, and a transparent front electrode layer 64 are stacked. The sheet luminescent member 44 is thin, and has a sheet shape and a thickness of 0.35 mm, for example. Due to the thin structure, the sheet luminescent member 44 is incorporated in the thin portable telephone 30, without a problem. The sheet luminescent member 44 has an area corresponding to a total of an area of the keypad 32 and an area of the liquid crystal display assembly 48. As shown in FIG. 9A, the sheet luminescent member 44 is approximately rectangular and has four sides, 44a, 44b, 44c and 44d.

Further, as shown in FIG. 9A, the sheet luminescent member 44 has a plurality of openings 66, a slender opening 67, positioning holes 73, 74, and two terminals 68, 69, which terminals are provided along the side 44a. Each of the plurality of openings 66 has a position corresponding to a position of a projection 32d formed on a center of a rear surface of a respective key top 32a, shown in FIG. 7, corresponding to a respective contact dome 42b. Thereby, as shown in FIG. 7, each opening 66 provides a space in which a respective projection 32d comes into contact with a respective contact dome 42b. The slender opening 67 is used for fitting therein a rubber connector 83 of the liquid crystal display assembly 48, shown in FIG. 5.

As shown in FIG. 10, the terminal 68 is drawn from the rear electrode layer 61 and the terminal 69 is drawn from the front electrode layer 64. The two terminals 68 and 69 are arranged in positions corresponding to the positions of the pads 51 and 52, respectively. Through the terminals 68 and 69, an alternating-current electric current is supplied between the rear electrode layer 61 and the transparent front electrode layer 64. Thereby, an electric field is generated in the dielectric layer 62 and the phosphor layer 63. Thereby, a sulfurous component of phosphor (ZnS) of the phosphor layer 63 is energized and thus emits light. The emitted light is output through the transparent front electrode layer 64. Thus, the sheet luminescent member 44 emits light from the entirety of a front surface 70 excepting portions of the openings 66 and the slender opening 67.

Figure 6:
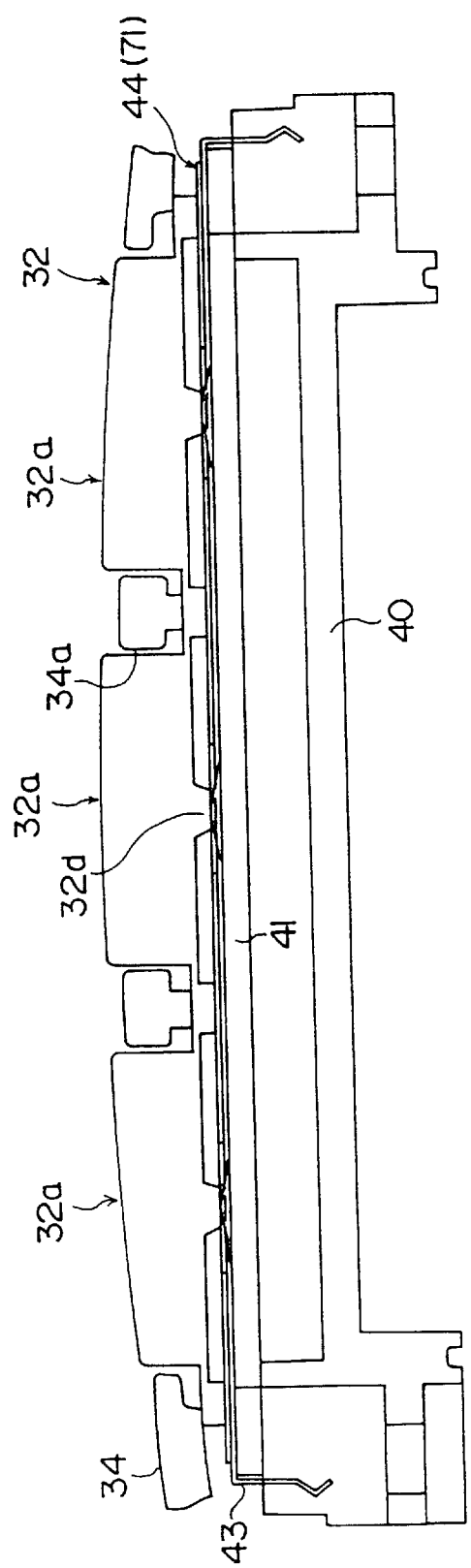
FIG. 6 shows a magnified cross-sectional view of a front half of the portable telephone shown in FIG. 4A, viewed along a line VI—VI.
Figure 7:
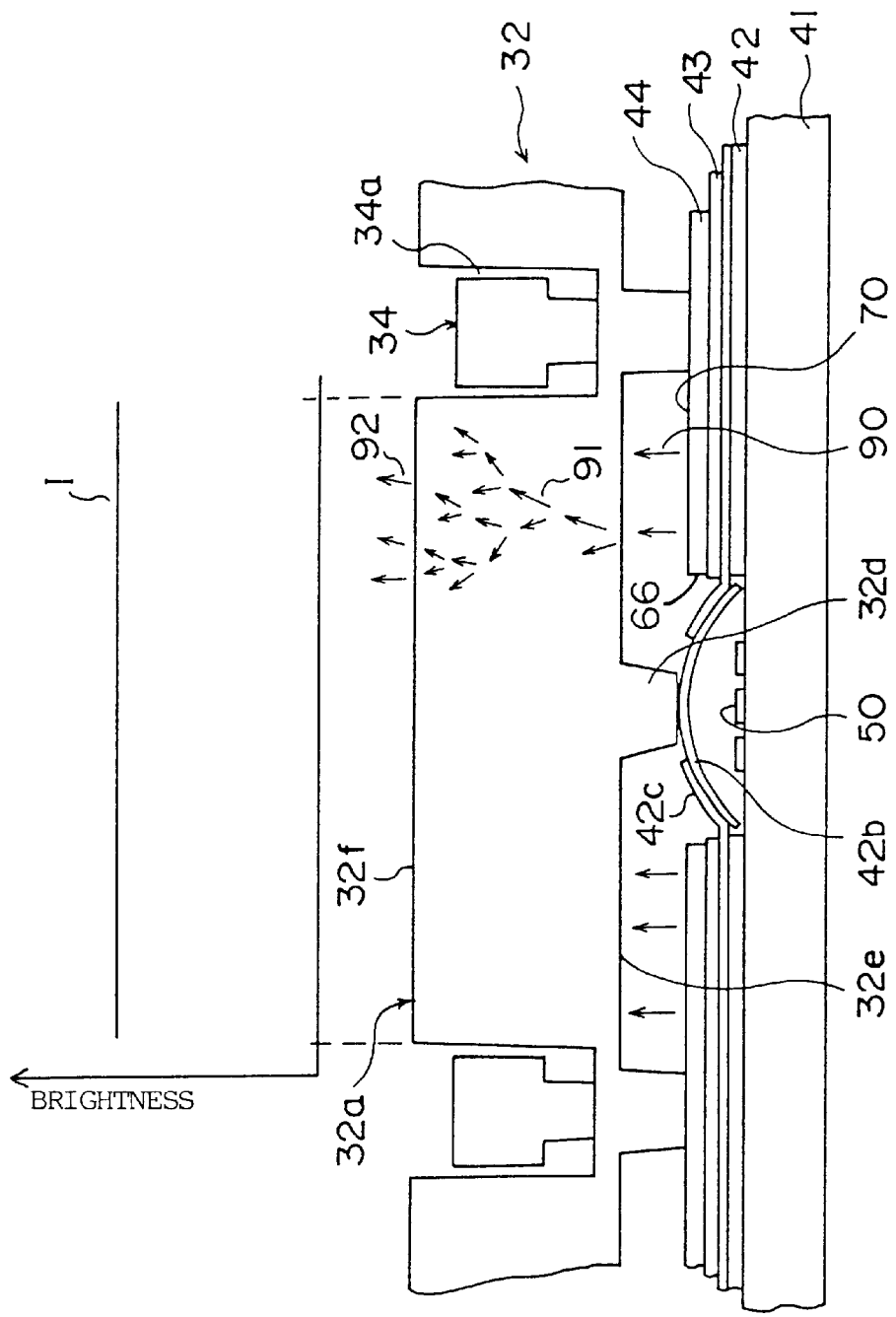
FIG. 7 shows a further partial magnified view of the view shown in FIG. 6, illustrating key-top lighting.

The sheet luminescent member 44, as shown in FIGS. 5, 6 and 7, is mounted so as to overlay the shield board member 43. The positioning holes 73 and 74 are used for positioning. Thus, the openings 66 correspond to the openings 43a and contact domes 42b, respectively, and the slender opening 67 corresponds to the pad group 53. The terminals 68 and 69 are soldered to the pads 51 and 52, respectively. As shown in FIG. 7, each contact dome 42b is exposed via a respective opening 66. Further, the pad group 53 is exposed via the slender opening 67. The other pad group 54 extends along the side 44b of the sheet luminescent member 44.

As shown in FIG. 9A, the sheet luminescent member 44 has a keypad facing portion 71 which faces the keypad 32, and a liquid-crystal-display-assembly facing portion 72 which faces the liquid crystal display assembly 48. The keypad facing portion 71 is located between the slender opening 67 and the side 44a, and has the openings 66 formed therein. The liquid-crystal-display facing portion 72 is located between the slender opening 67 and the side 44b.

As shown in FIG. 5, the liquid-crystal-display assembly 48 has a structure in which a liquid crystal board 80 is inserted between a rear board member 81 and a frame member 82. The liquid crystal display assembly 48 is fixed onto the front printed board 41. A rubber connector 83 and a rubber connector 84 are inserted between the liquid crystal board 80 and the front printed board 41 at the positions of the pad groups 53 and 54, respectively. Each of the rubber connectors 83 and 84 has a structure in which many thin connector pins penetrate a rubber-made regular prism. The rubber connector 83 is located in the slender opening 67 and is in contact with the pad group 53. The rubber connector 84 extends along the side 44b and is in contact with the pad group 54. The liquid crystal board 80 is electrically connected with the front printed board 41 via the connector pins in the rubber connectors 83 and 84, and the pad groups 53 and 54.

Further, a printed board assembly and so forth are mounted on the rear surface of the shield case 40, but a structure thereof is not shown in the figures.

Figure 11:
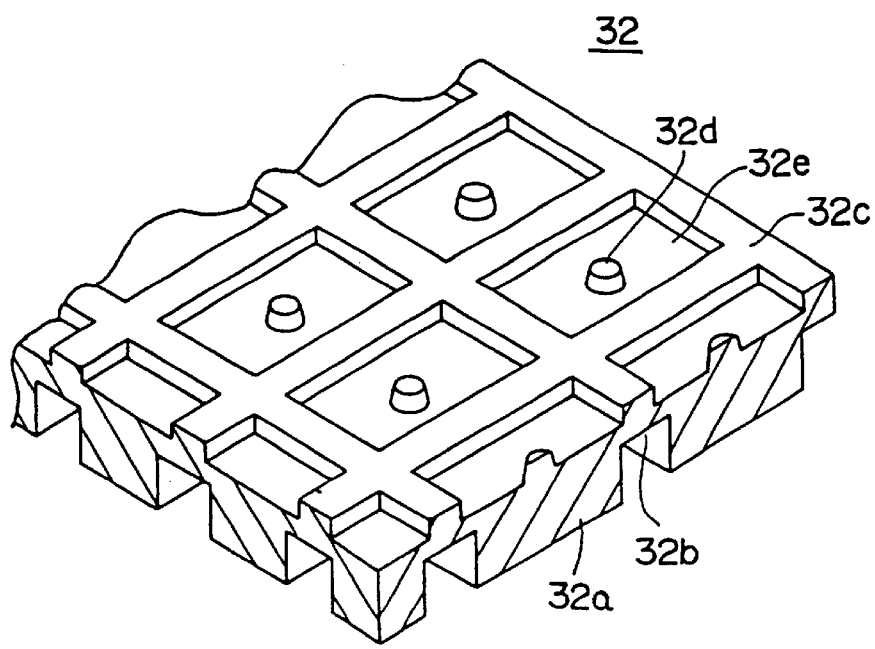
FIG. 11 shows a partial perspective view a keypad used in the portable telephone shown in FIG. 3, showing a rear surface thereof.

The keypad 32 is made of a rubber and has a light transmission property. As shown in FIGS. 3 and 6, a plurality of key tops 32a project from the front surface of the keypad 32 so as to be aligned with each other in positions corresponding to those of the contact domes 42b shown in FIG. 5. As a result, lattice-shaped grooves 32b are formed between key tops 32a. As shown in FIG. 11, lattice-shaped ribs 32c are formed between the positions of the key tops 32a on the rear surface of the keypad 32. Further, a projection 32d projects from the rear surface of the keypad 32 at a center of a position of each key top 32a, and is used to press a respective contact dome 42b.

The keypad 32 is placed on the keypad facing portion 71 of the sheet luminescent member 44, and held onto the sheet luminescent member 44 by the front case assembly 34. The lattice-shaped ribs 32c are in contact with the front surface of the sheet luminescent member 44, and each projection 32d is in contact with a respective contact dome 42b above a respective opening 66. As shown in FIGS. 3 and 6, each key top 32a projects through a respective hole 34a formed in the front case assembly 34.

With reference to FIG. 7, when a key top 32a is pressed down by a finger of a user, the key top 32a is lowered and thereby a respective projection 32d presses a respective contact dome 42b. Thereby, the contact dome 42b is deformed so as to come into contact with and thus short-circuit respective contact terminals 50 shown in FIG. 7. As a result, a respective key switch of the contact dome 42b and the contact terminals 50 are in an on state. Thus, an operation of causing the key switch to be in the on state can be performed without any obstruction by the sheet luminescent member 44.

Figure 8:
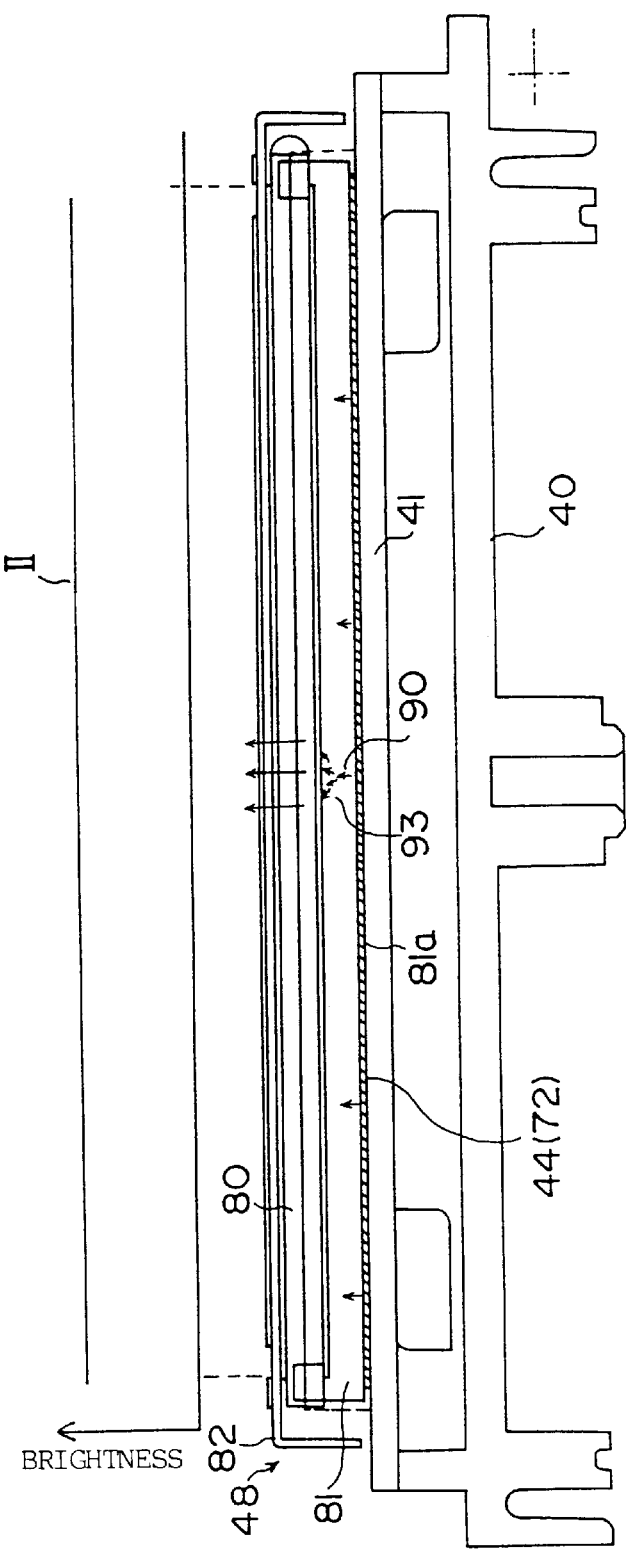
FIG. 8 shows a magnified cross-sectional view of a front half of the portable telephone shown in FIG. 4A, viewed along a line VIII—VIII, illustrating liquid-crystal-display-assembly lighting.

With reference to FIGS. 7 and 8, a lighting state in which the portable telephone 30 is used at night and each key top 32a is lit from the inside of the portable telephone 30 will now be described.

When a user operates the portable telephone 30 in a predetermined way such that the portable telephone 30 has each key top 32a of the keypad 32 lit from the inside of the portable telephone 30, the sheet-luminescent-member driving circuit 55 operates for a predetermined time period. Thus an alternating-current electric current flows through the sheet luminescent member 44 via the terminals 68 and 69. Thereby, the sheet luminescent member 44 emits light from the entirety of the front surface 70 thereof excepting the portions of the openings 66 and the slender opening 67 for the predetermined time period. As a result, light 90 goes upward as shown in FIGS. 7 and 8.

With regard to the keypad 32, as shown in FIG. 7, the light going upwardly from the keypad facing portion 71 then penetrates each key top 32a from the entire rear surface 32e of the key top 32a. The light is propagated and diffuses in the key top 32a as indicated by a reference numeral 91. Then, as indicated by a reference numeral 92, the light goes out of the key top 32a from the entire front surface 32f of the key top 32a. The same operation is performed for each key top 32a.

Figure 2:
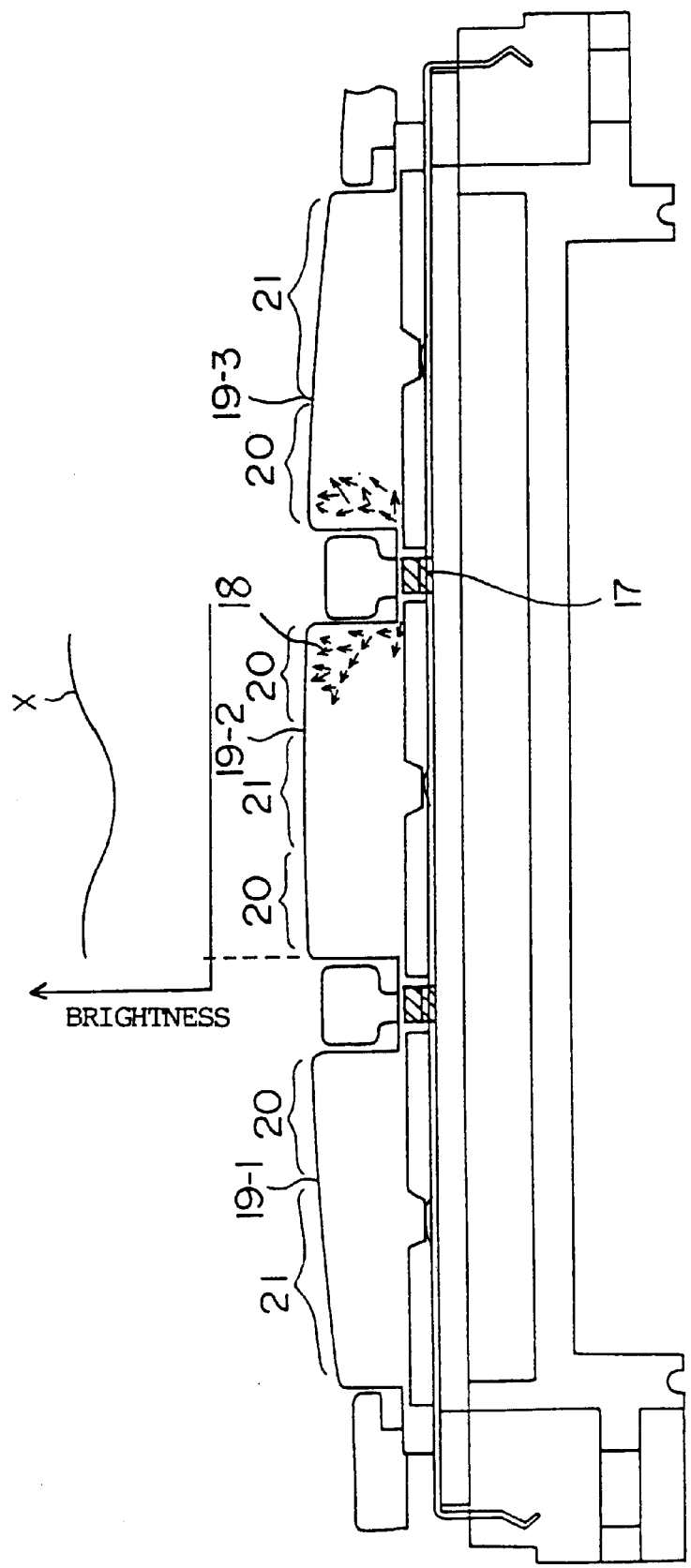
FIG. 2 shows a magnified cross-sectional view of the telephone shown in FIG. 1, viewed along a line II—II in FIG. 1, illustrating key-top lighting.

Because the light 90 penetrates the entire rear surface 32e of each key top 32a into the key top 32a, an intensity of the light going out of the entire front surface 32f of each key top 32a is approximately uniform through the entire front surface 32f. Therefore, as shown in a line I of brightness shown in FIG. 7, brightness on the front surface 32f of each key top 32a is approximately uniform throughout the entirety of the front surface 32f. As a result, unevenness in brightness occurring in the related art such as that indicated by the curve X shown in FIG. 2 can be eliminated. Thus, the above-described portable telephone 30 has an appearance quality better than that of the related art.

With regard to the liquid crystal display assembly 48, as shown in FIG. 8, light 90 emitted upwardly from the liquid-crystal-display-assembly facing portion 72 enters the rear board member 81 through the entirety of a rear surface 81a of the transparent rear board member 81. The entering light diffuses as indicated by a reference numeral 93 in the rear board member 81. As a result, the light lights the entire surface of the liquid crystal board 80. Thereby, brightness of the liquid crystal board 80 is approximately uniform throughout the entirety of the front surface of the liquid crystal board 80 as indicated by a line II of brightness shown in FIG. 8. As a result, unevenness in brightness occurring in the related art can be eliminated. Thus, the liquid crystal display assembly 48 of the above-described portable telephone 30 has a display quality better than that of the related art.

Further, in comparison to a structure of the related art in which many LEDs are provided, a number of assembling work steps therefore can be effectively reduced.

In the first embodiment, the sheet luminescent member 44 includes both the keypad facing portion 71 facing the keypad 32 and the liquid-crystal-display-assembly facing portion 72 facing the liquid crystal display assembly 48. However, a structure is also possible in which the sheet luminescent member 44 includes only the keypad facing portion 71 facing the keypad 32. Similarly, a structure is also possible in which the sheet luminescent member 44 includes only the liquid-crystal-display-assembly facing portion 72 facing the liquid crystal display assembly 48.

Further, instead of using the integral keypad 32, it is also possible to use separate key tops assembled individually.

A second embodiment of the present invention will now be described. For the second embodiment, a detailed description will be omitted because the second embodiment has a structure similar to that of the first embodiment described above.

Figure 12:
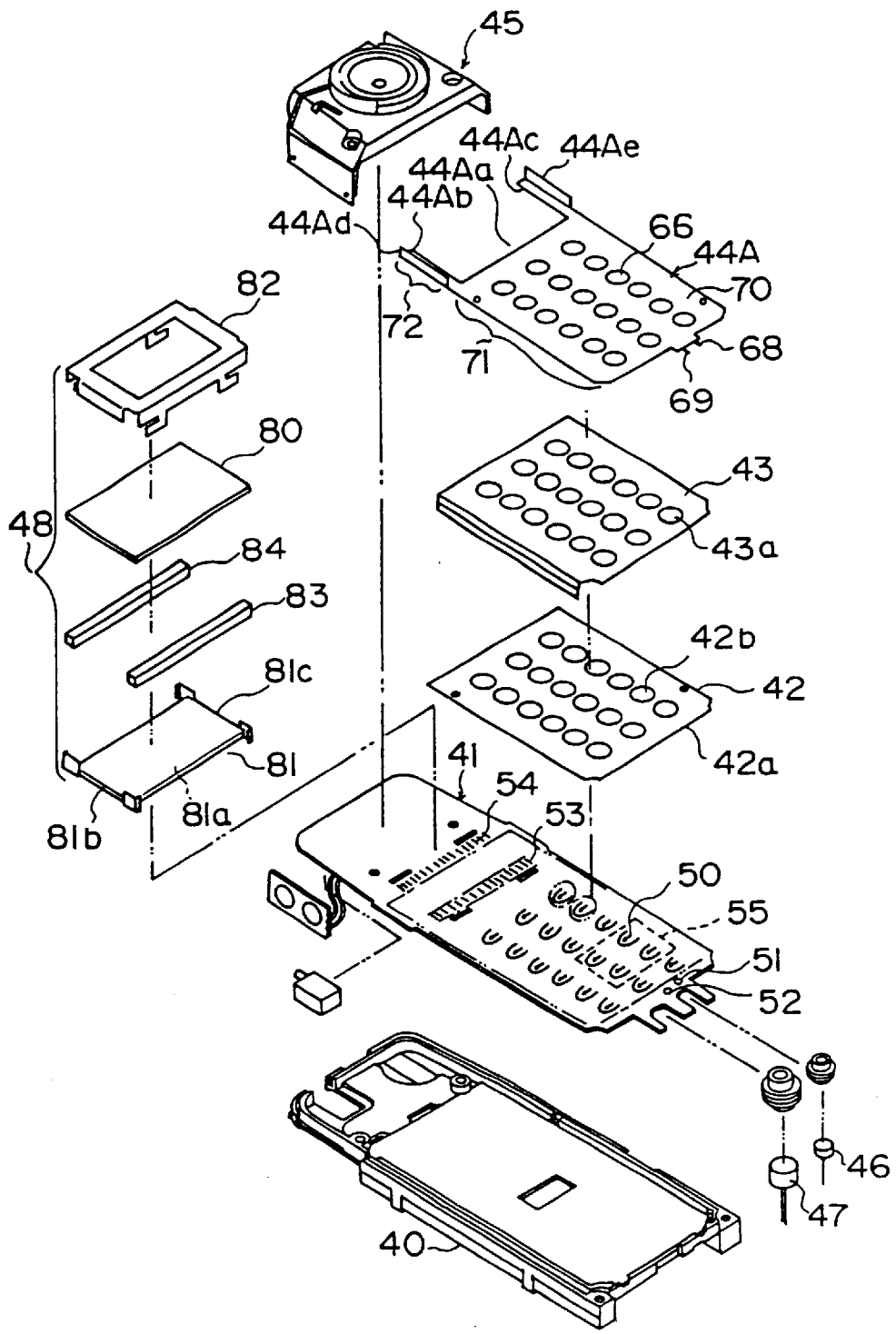
FIG. 12 shows an exploded perspective view of a front half of a telephone body assembly in a portable telephone in a second embodiment of the present invention.

FIG. 12 shows an exploded, perspective view of a telephone body assembly 31A of a portable telephone in the second embodiment of the present invention. The telephone body assembly 31A has a structure the same as that of the telephone body assembly 31 in the portable telephone in the first embodiment shown in FIG. 5, except for a structure of the sheet luminescent member.

A sheet luminescent member 44A of the telephone body assembly 31A in the second embodiment is obtained as a result of modifying the sheet luminescent member 44 in the telephone body assembly 31 in the first embodiment, as will now be described. A portion between the slender opening 67 and the side 44b is removed from the sheet luminescent member 44. Thereby, a rectangular cut-out 44A*a* is provided having a size of the liquid crystal display assembly 48. Further, a pair of arms 44A*b* and 44A*c* is provided, each extending from a respective side of the keypad facing portion 71. Further, each of standing portions 44A*d* and 44A*e* stands upwardly from a respective one of the arms 44A*b* and 44A*c* as a result of an outer edge of the respective one of the arms 44A*b* and 44A*c* being bent vertically.

With regard to the keypad 32, as shown in FIG. 7, the light 90 upwardly emitted from the keypad facing portion 71 lights the keypad 32.

Figure 13:
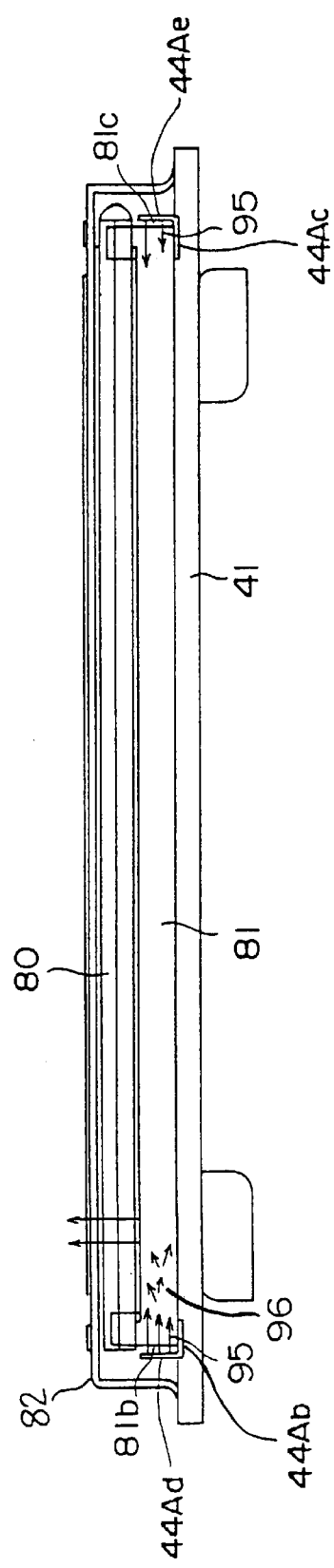
FIG. 13 shows a magnified cross-sectional view of the telephone body assembly in the portable telephone shown in FIG. 12, illustrating liquid-crystal-display-assembly lighting.

With regard to the liquid crystal display assembly 48, as shown in FIG. 13, light horizontally, inwardly emitted from each of the standing portions 44A*d* and 44A*e* enters the transparent rear board member 81 through a respective one of side surfaces 81*b* and 81*c* of the rear board member 81. Then, as indicated by a reference numeral 96, the entering light 95 is propagated and diffuses in the transparent rear board member 81. As a result, the light goes out from the rear board member 81 through the front surface thereof and lights the liquid crystal board 80 from the rear surface thereof.

Because the light 95 is incident on the entirety of each of the side surfaces 81*b* and 81*c* of the transparent rear board member 81, the resulting brightness of the liquid crystal board 80 has unevenness less than that of the related art. As a result, the display quality of the liquid crystal board 80 is higher than that of the related art.

Further, the liquid crystal display assembly 48 is located within the cut-out 44A*a*, and thereby the sheet luminescent member 44A is not provided in the rear-surface side of the liquid crystal display assembly 48. As a result, an increase in the thickness of the liquid crystal display assembly 48 due to the presence of the sheet luminescent member 44A in the rear side of the liquid crystal display assembly 48 can be prevented.

Figure 14:
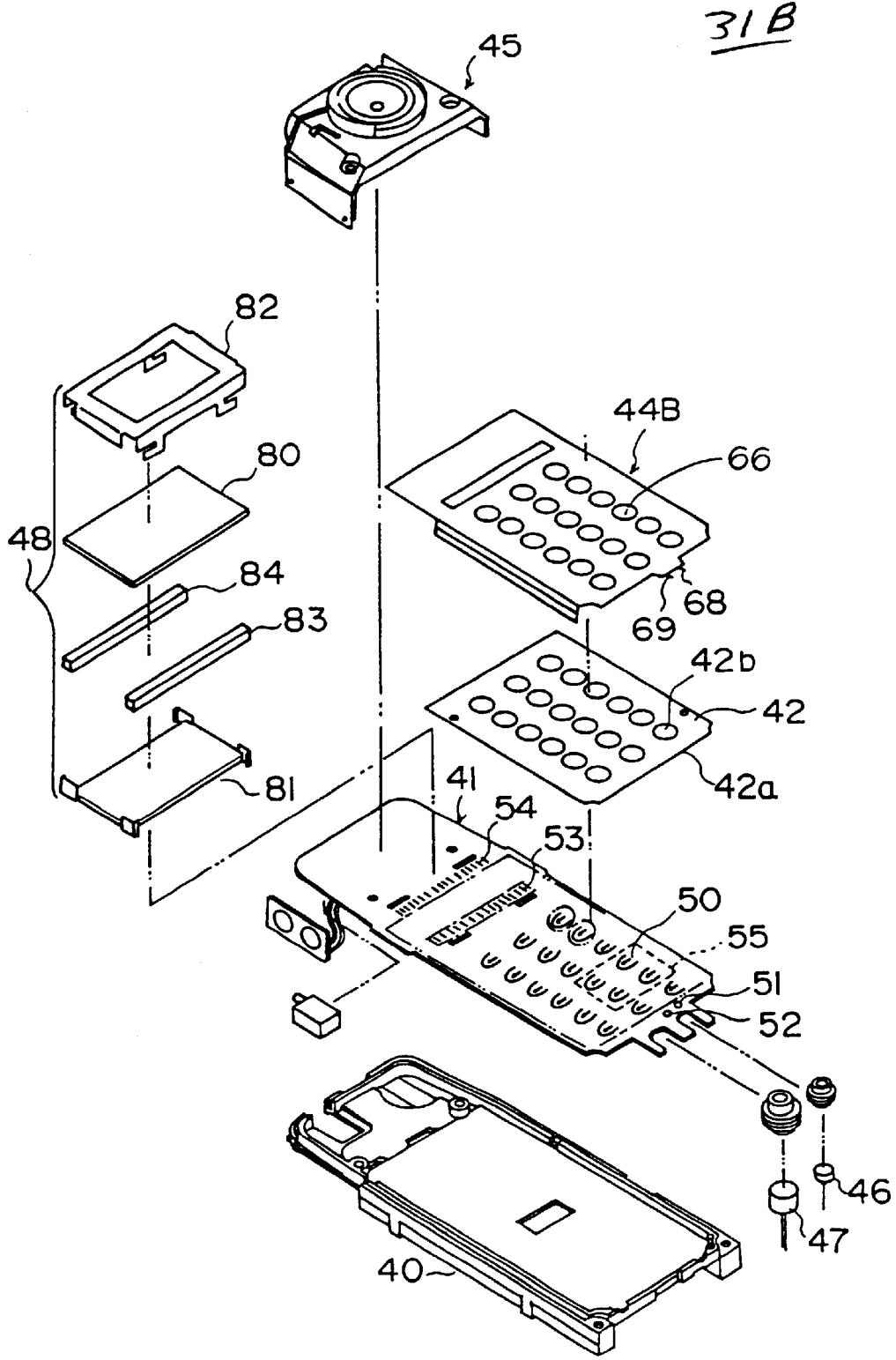
FIG. 14 shows an exploded perspective view of a front half of a telephone body assembly in a portable telephone in a third embodiment of the present invention.

FIG. 14 shows an exploded, perspective view of a telephone body assembly 31B of a portable telephone in a third embodiment of the present invention. The telephone body assembly 31B has a structure the same as that of the telephone body assembly 31 shown in FIG. 5, except for the sheet luminescent member.

Figure 15:
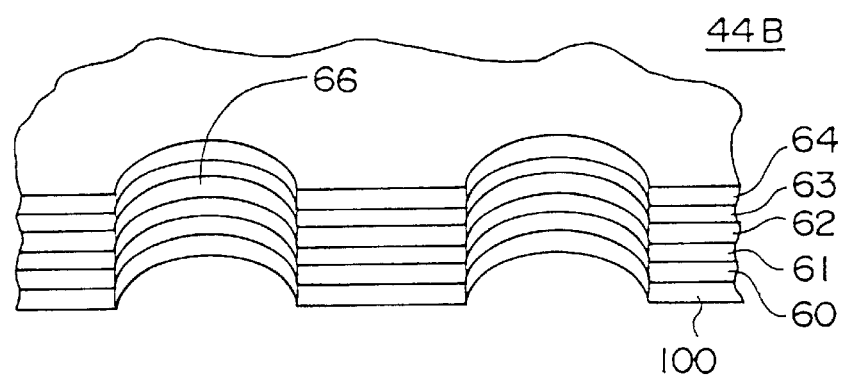
FIG. 15 shows a magnified perspective view of a cut part of a sheet luminescent member shown in FIG. 14.
Figure 16:
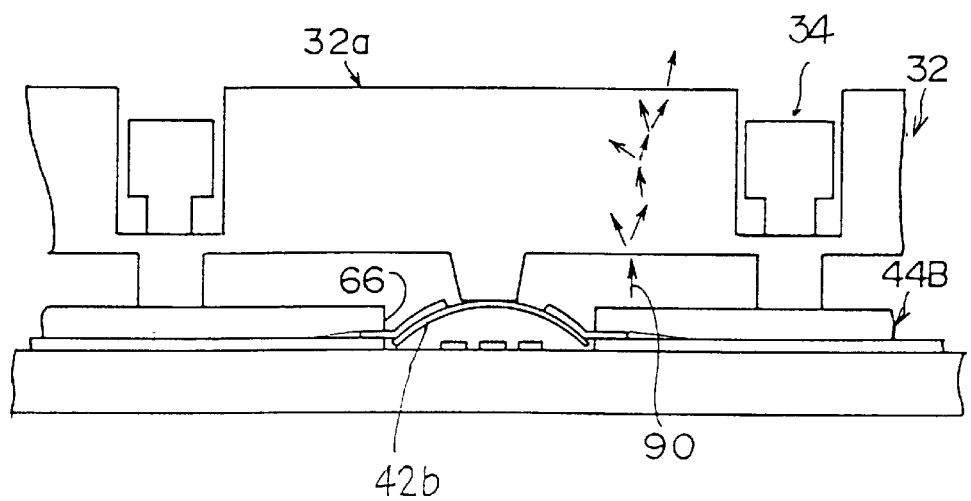
FIG. 16 shows a magnified sectional view of the portable telephone shown in FIG. 14, illustrating a spatial relationship between the sheet luminescent member and a keypad.

FIG. 15 shows a perspective view of a part of a sheet luminescent member 44B in the third embodiment, the part resulting from cutting the sheet luminescent member 44B along a line passing through the centers of openings 66, and the view including a view of the cut surface of the part. As shown in FIG. 15, the sheet luminescent member 44B includes the rear insulation layer 60, rear electrode layer 61, dielectric layer 62, phosphor layer 63 and transparent front electrode layer 64, which layers are stacked. Further, a metallic sheet 100 is stacked on the rear surface of the rear insulation layer 60. The metallic sheet 100 has an electric shielding function. The sheet luminescent member 44B has the electric shielding function in addition to the luminescence function. Therefore, the shield board member 43 shown in FIG. 5 is not provided as shown in FIGS. 14 and 16.

Figure 17:
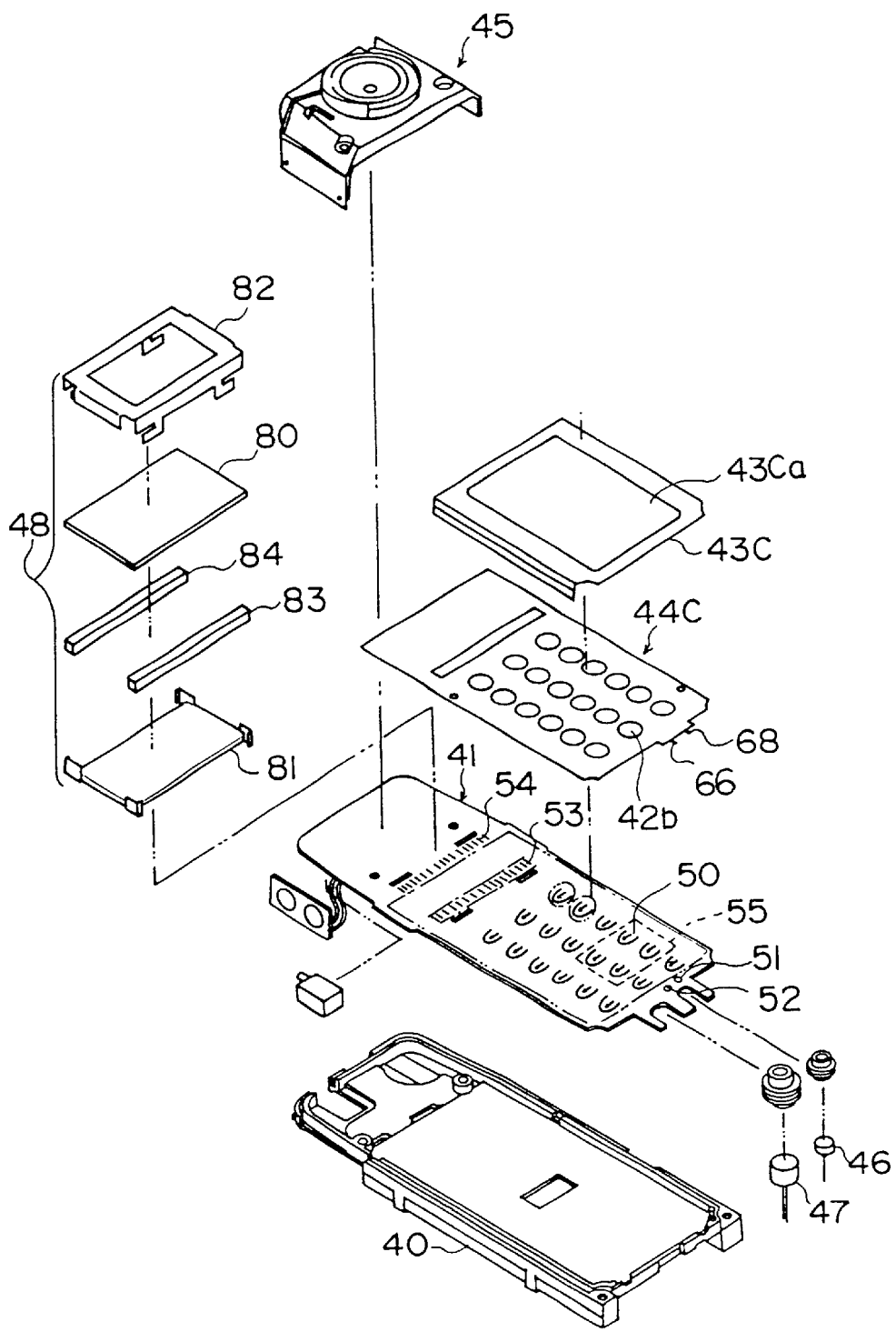
FIG. 17 shows an exploded perspective view of a front half of a telephone body assembly in a portable telephone in a fourth embodiment of the present invention.

FIG. 17 shows an exploded, perspective view of a telephone body assembly 31C of a portable telephone in a fourth embodiment of the present invention.

On the front printed board 41, a sheet luminescent member 44C and a shield board member 43C are stacked in this order.

Figure 18:
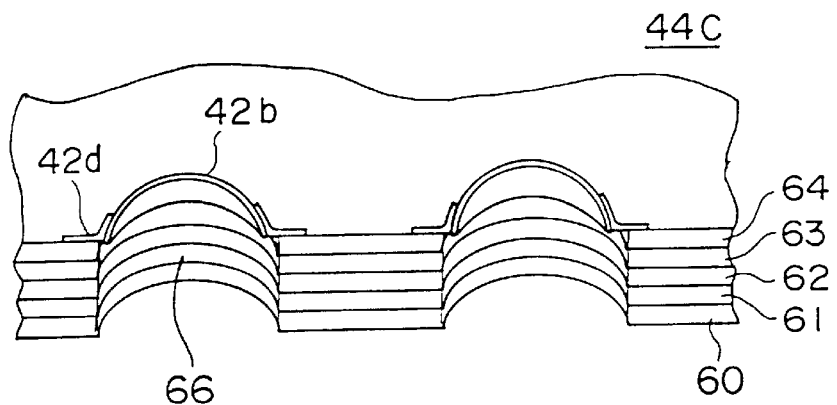
FIG. 18 shows a magnified perspective view of a cut part of a sheet luminescent member shown in FIG. 17.
Figure 19:
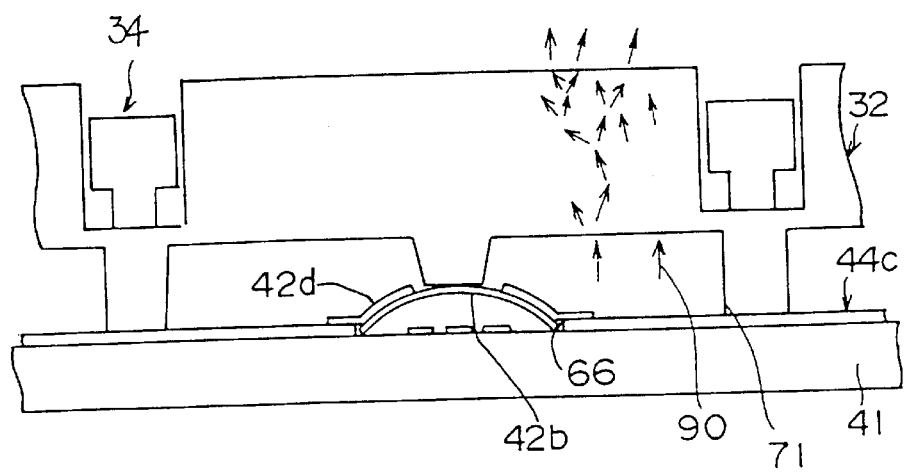
FIG. 19 shows a magnified sectional view of the portable telephone shown in FIG. 17, illustrating a spatial relationship between the sheet luminescent member and a keypad.

FIG. 18 shows a perspective view of a part of the sheet luminescent member 44C in the fourth embodiment, the part resulting from cutting the sheet luminescent member 44C along a surface passing through the center axes of openings 66, and the view including a view of the cut surface of the part. As shown in FIGS. 18 and 19, in each opening 66, a respective contact dome 42*b*, also cut by the cutting surface in the figures, is supported by adhesive tape 42*d*. In this structure, provision of the key contact plate 42 shown in FIG. 5 is not necessary. In other words, the sheet luminescent member 44C also acts as the key contact board 42 as shown in FIG. 19.

As shown in FIG. 17, the shield board member 43C having a large opening 43C*a* formed therein overlies the sheet luminescent member 44C. The large opening 43C*a* is used for light passing therethrough.

Figure 20:
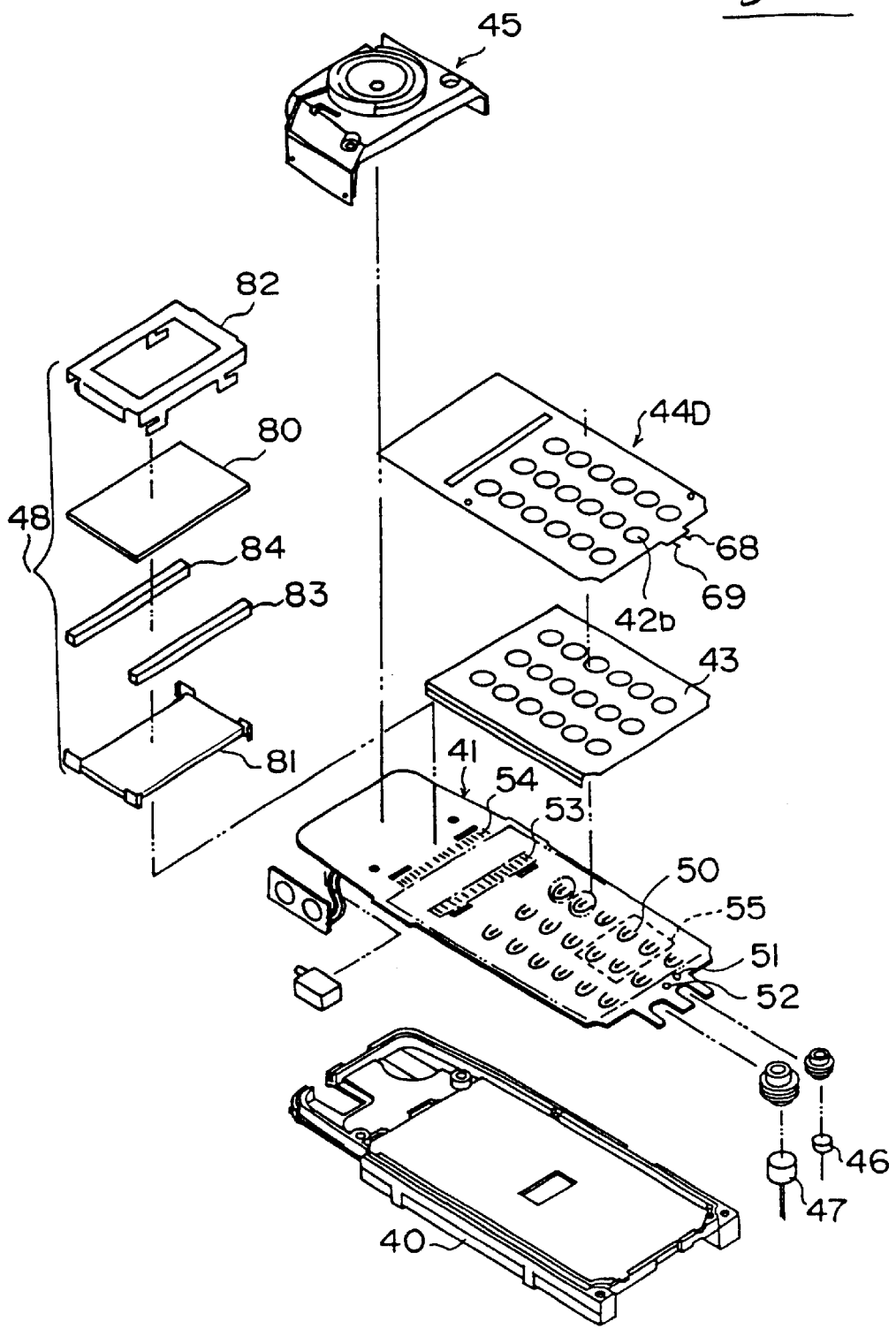
FIG. 20 shows an exploded perspective view of a front half of a telephone body assembly in a portable telephone in a fifth embodiment of the present invention.

FIG. 20 shows an exploded, perspective view of a telephone body assembly 31D of a portable telephone in a fifth embodiment of the present invention.

In the telephone body assembly 31D in the fifth embodiment, reverse to the case of the fourth embodiment described above, a sheet luminescent member 44D is provided above the shield board member 43. On the front printed board 41, the shield board member 43 and the sheet luminescent member 44D are stacked in this order.

Figure 21:
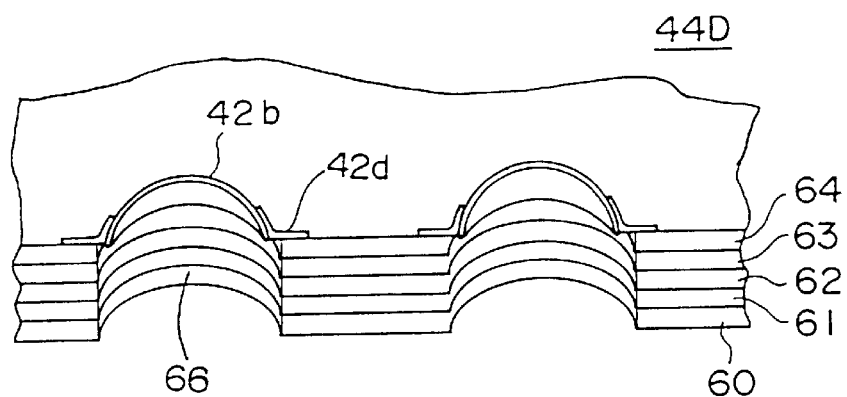
FIG. 21 shows a magnified perspective view of a cut part of a sheet luminescent member shown in FIG. 20.
Figure 22:
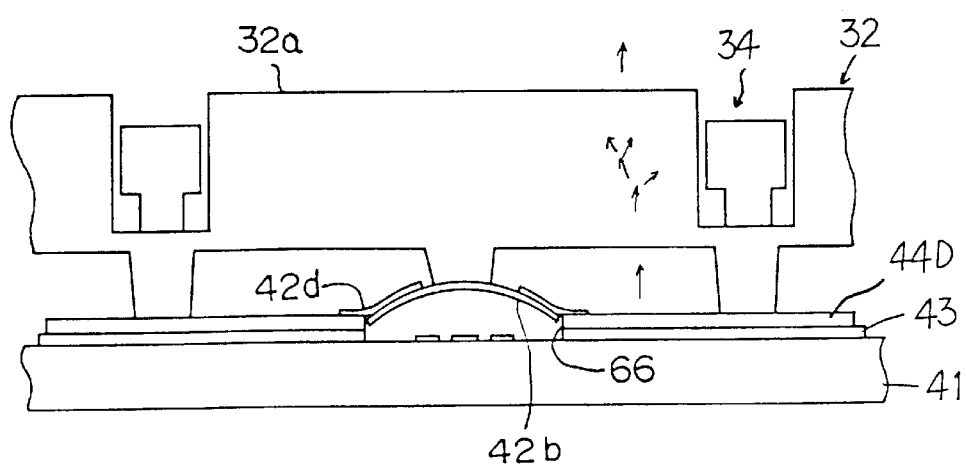
FIG. 22 shows a magnified sectional view of the portable telephone shown in FIG. 20, illustrating a spatial relationship between the sheet luminescent member and a keypad.

FIG. 21 shows a perspective view of a part of the sheet luminescent member 44D in the fifth embodiment, the part resulting from cutting the sheet luminescent member 44D along a surface passing through the center axes of openings 66, and the view including a view of the cut surface of the part. As shown in FIGS. 21 and 22, in each opening 66, a respective contact dome 42b, also cut by the cutting surface in the figures, is supported by the adhesive tape 42d. In this structure, provision of the key contact plate 42 shown in FIG. 5 is not necessary. In other words, the sheet luminescent member 44D also acts as the key contact board 42 as shown in FIG. 22.

Figure 23:
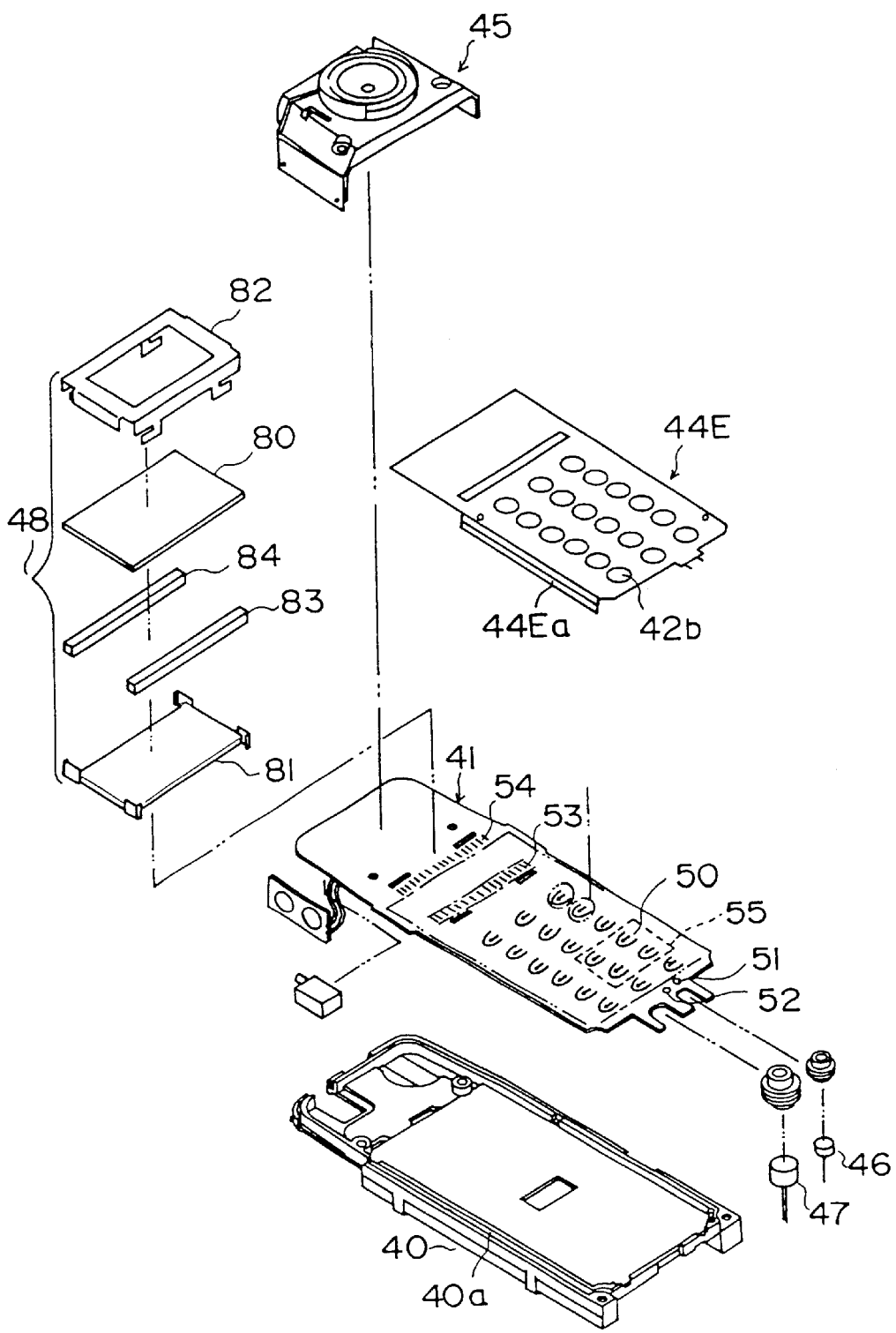
FIG. 23 shows an exploded perspective view of a front half of a telephone body assembly in a portable telephone in a sixth embodiment of the present invention.

FIG. 23 shows an exploded, perspective view of a telephone body assembly 31E of a portable telephone in a sixth embodiment of the present invention.

Figure 25:
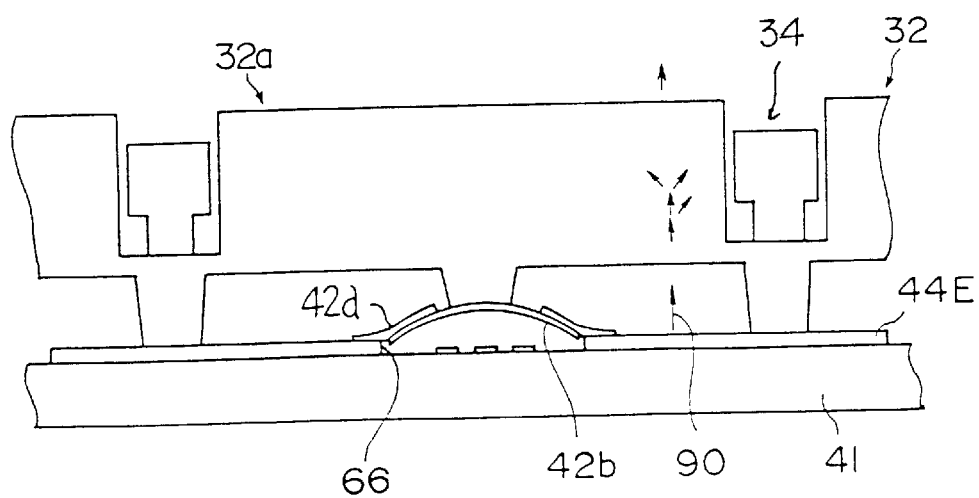
FIG. 25 shows a magnified sectional view of the portable telephone shown in FIG. 23, illustrating a spatial relationship between the sheet luminescent member and a keypad.

With reference to FIGS. 23 and 25, only a sheet luminescent member 44E overlies the front printed board 41.

Figure 24:
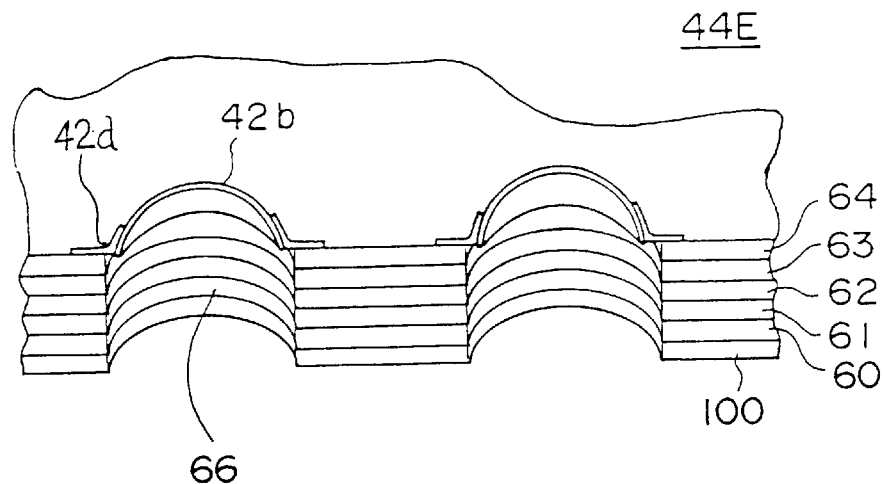
FIG. 24 shows a magnified perspective view of a cut part of a sheet luminescent member shown in FIG. 23.

FIG. 24 shows a perspective view of a part of the sheet luminescent member 44E in the sixth embodiment, the part resulting from cutting the sheet luminescent member 44E along a line passing through the centers of openings 66, and the view including a view of the cut surface of the part. As shown in FIG. 24, the sheet luminescent member 44E includes the rear insulation layer 60, rear electrode layer 61, dielectric layer 62, phosphor layer 63 and front transparent electrode layer 64, which layers are stacked. Further, a metallic sheet 100 is stacked on the rear surface of the rear insulation layer 60. The metallic sheet 100 has an electric shielding function. Further, in each opening 66, a respective contact dome 42b, also cut by the cutting surface in the figure, is supported by the adhesive tape 42d. In the sixth embodiment, the sheet luminescent member 44E thus has functions of the shield board member 43 and key contact board 42 shown in FIG. 5, in addition to the luminescence function. Therefore, the telephone body assembly 31E does not include the shield board member 43 and key contact board 42 shown in FIG. 5.

The sheet luminescent member 44E includes, as shown in FIG. 23, a bent portion 44Ea, bent downwardly, at each side thereof. Each bent portion 44Ea is fitted into a respective groove 40a formed on the shield case 40, and thereby the sheet luminescent member 44E is seated onto the shield case 40.

Figure 26:
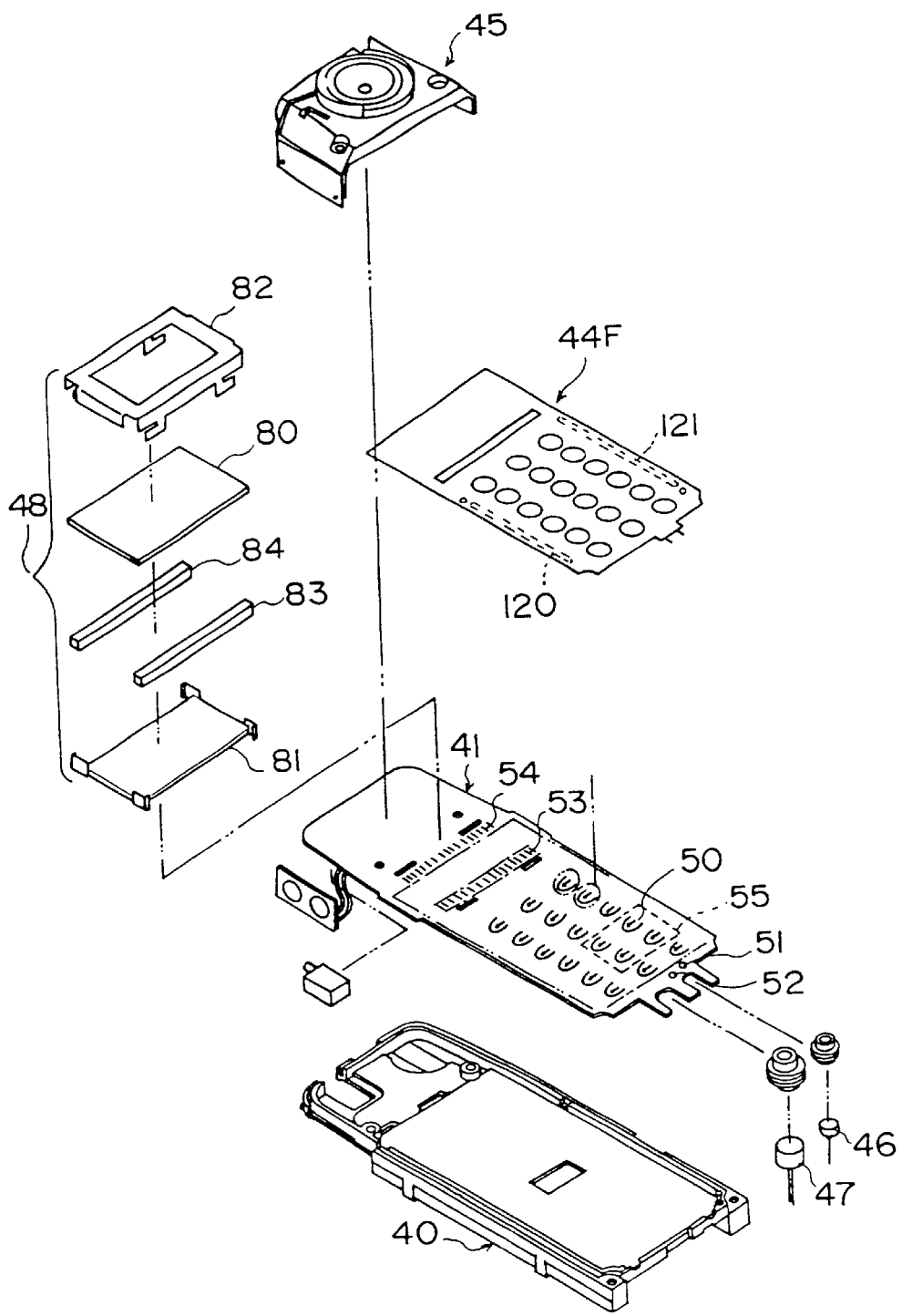
FIG. 26 shows an exploded perspective view of a front half of a telephone body assembly in a portable telephone in a seventh embodiment of the present invention.

FIG. 26 shows an exploded, perspective view of a telephone body assembly 31F of a portable telephone in a seventh embodiment of the present invention.

A sheet luminescent member 44F in the seventh embodiment has the same structure as that of the sheet luminescent member 44E in the sixth embodiment described above, except that the luminescent member 44F in the seventh embodiment does not have any bent portion 44Ea. Portions of the sheet luminescent member 44F along the long sides of the sheet luminescent member 44F are adhered through electrically conductive, double-sided adhesive tape 120 and 121, and thus the sheet luminescent member 44F is seated onto the front printed board 41. Thereby, the metal sheet 100 of the sheet luminescent member 44F is electrically connected with a ground pattern formed on the front printed board 41.

Figure 27:
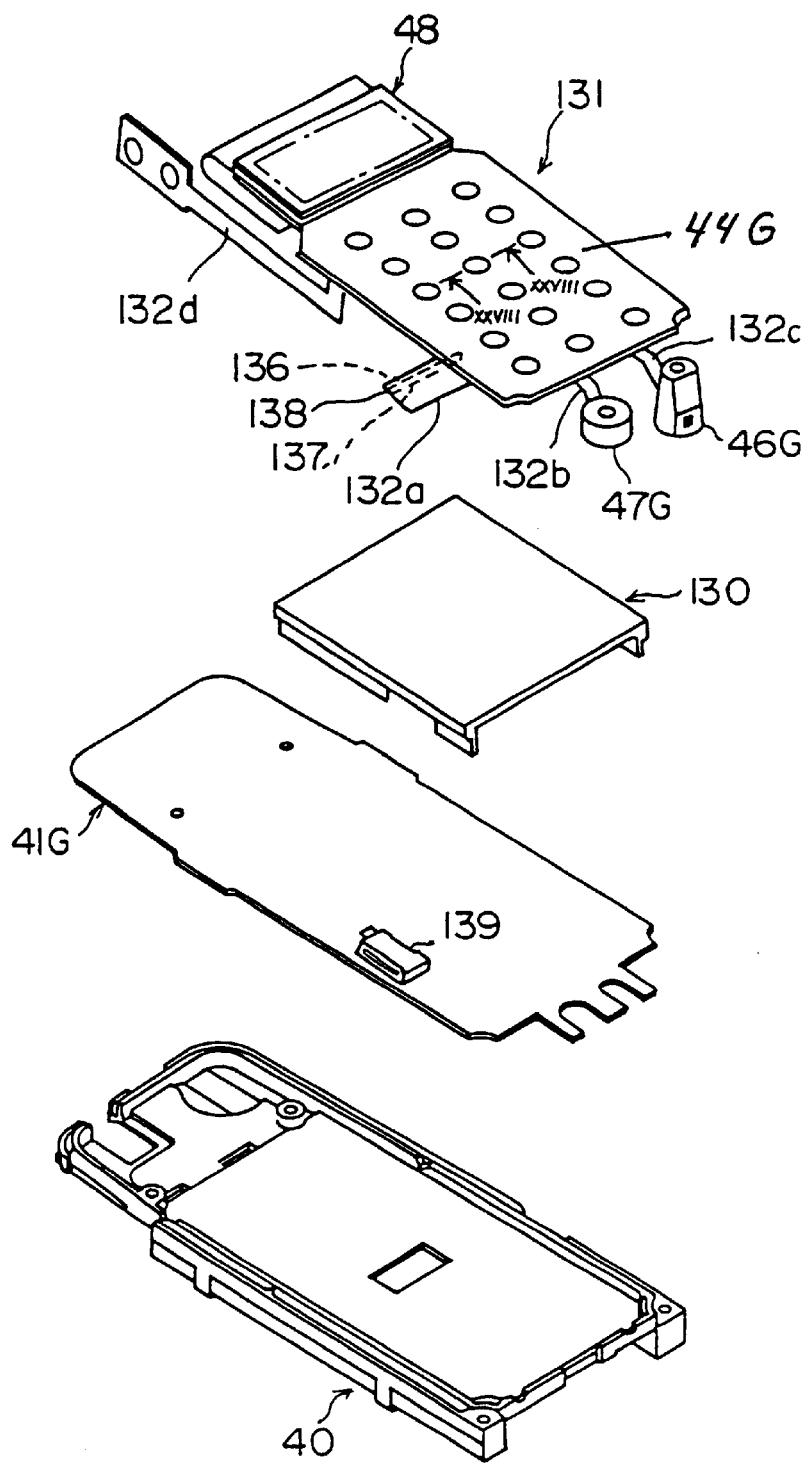
FIG. 27 shows an exploded perspective view of a front half of a telephone body assembly in a portable telephone in an eighth embodiment of the present invention.

FIG. 27 shows an exploded, perspective view of a telephone body assembly 31G of a portable telephone in an eighth embodiment of the present invention.

In the telephone body assembly 31G, a front printed board 41G is placed on the front-surface side of the shield case 40. Further, a base member 130 is seated on the shield case 40 as the base member 130 straddles the front printed board 41G. Further, a sheet-luminescent-member assembly 131 is placed on the base member 130.

Figure 28:
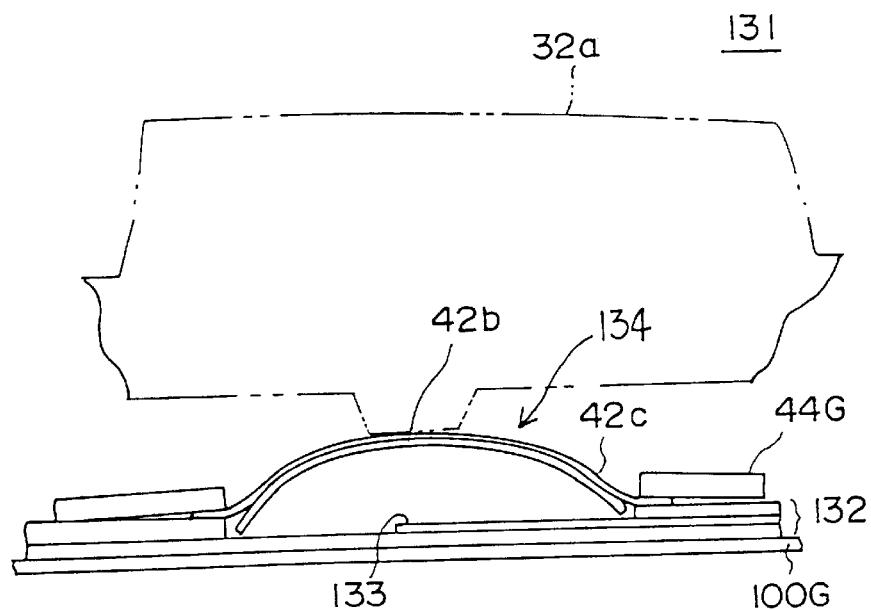
FIG. 28 shows a partial cross-sectional view of a sheet luminescent member shown in FIG. 27, viewed along a line XXVIII—XXVIII.

In the sheet-luminescent-member assembly 131, as shown in FIGS. 27 and 28, a flexible printed board 132 is a body. The flexible printed board 132 has contact terminals 133 shown in FIG. 28, the contact dome 42b supported by the double-sided adhesive tape 42c, and key switches 134. Each key switch 134 is formed of respective contact terminals 133 and a respective contact dome 42b. When the contact dome 42b is pressed and deformed downwardly, the contact dome short-circuits the contact terminals 133 and thus the key switch 134 is in its on state.

A metal sheet 100G is adhered onto the rear surface of the flexible printed board 132. A sheet luminescent member 44G is adhered onto the front surface of the flexible printed board 132. The liquid crystal display assembly 48 is fastened onto the sheet luminescent member 44G, as shown in FIG. 27. The flexible printed board 132 has a plurality of arms 132a, 132b, 132c and 132d, each outwardly extending from the flexible printed board 132. A microphone 46G is connected to the arm 132c, a buzzer 47G is connected to the arm 132b, and a volume key 135 is connected to the arm 132d. The arm 132a has thereon two wiring patterns 136 and 137 which are soldered to the sheet luminescent member 44G. The arm 132a further has thereon another plurality of wiring patterns (not shown in the figure). The arm 132a also has a plurality of terminals 138 provided at the extending end of the above-mentioned wiring terminals. The extending end of the arm 132a is connected with a connector 139 provided on the front printed board 41G.

Figure 29:
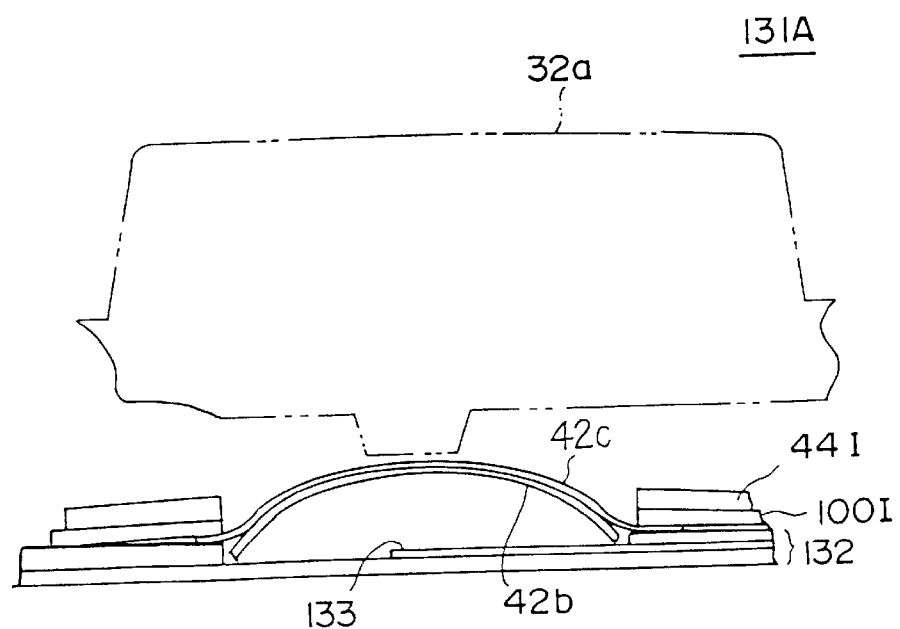
FIG. 29 shows a partial cross-sectional view of the sheet luminescent member shown in FIG. 27, viewed along a line XXVIII—XXVIII, in a variant example of the structure shown in FIG. 28.

FIG. 29 shows a variant example of the sheet-luminescent-member assembly 131 shown in FIG. 28. In the variant example 131A, a metal sheet 100I and a sheet luminescent member 44I are stacked on the flexible printed board 132 in this order.

Further, by providing the above-mentioned base member 130 which is made of a metal or made of a synthetic resin plated with a metal, and also has an electric shielding function, it is possible to omit provision of the metal sheet 100G (in the case of FIG. 28) and 100I (in the case of FIG. 29) from the sheet-luminescent-member assembly 131 and 131A, respectively.

FIGS. 30A and 30B show a sheet luminescent member 44I which is a first variant example of the sheet luminescent member 44 shown in FIGS. 9A and 9B. The sheet luminescent member 44I has an arm 44Ia which has two wiring patterns 150 and 151 formed thereon. The two wiring patterns 150 and 151 are drawn from electrodes of the sheet luminescent member 44I, respectively. For the wiring patterns 150 and 151, two terminals 152 and 153 are formed at the extending end of the arm 44Ia, respectively. This arm 44Ia of the sheet luminescent member 44I is bent and thus connected with a connector provided on the front printed board. Thereby, the sheet luminescent member 44I is electrically connected with the front printed board.

Figures 31A, 31B:
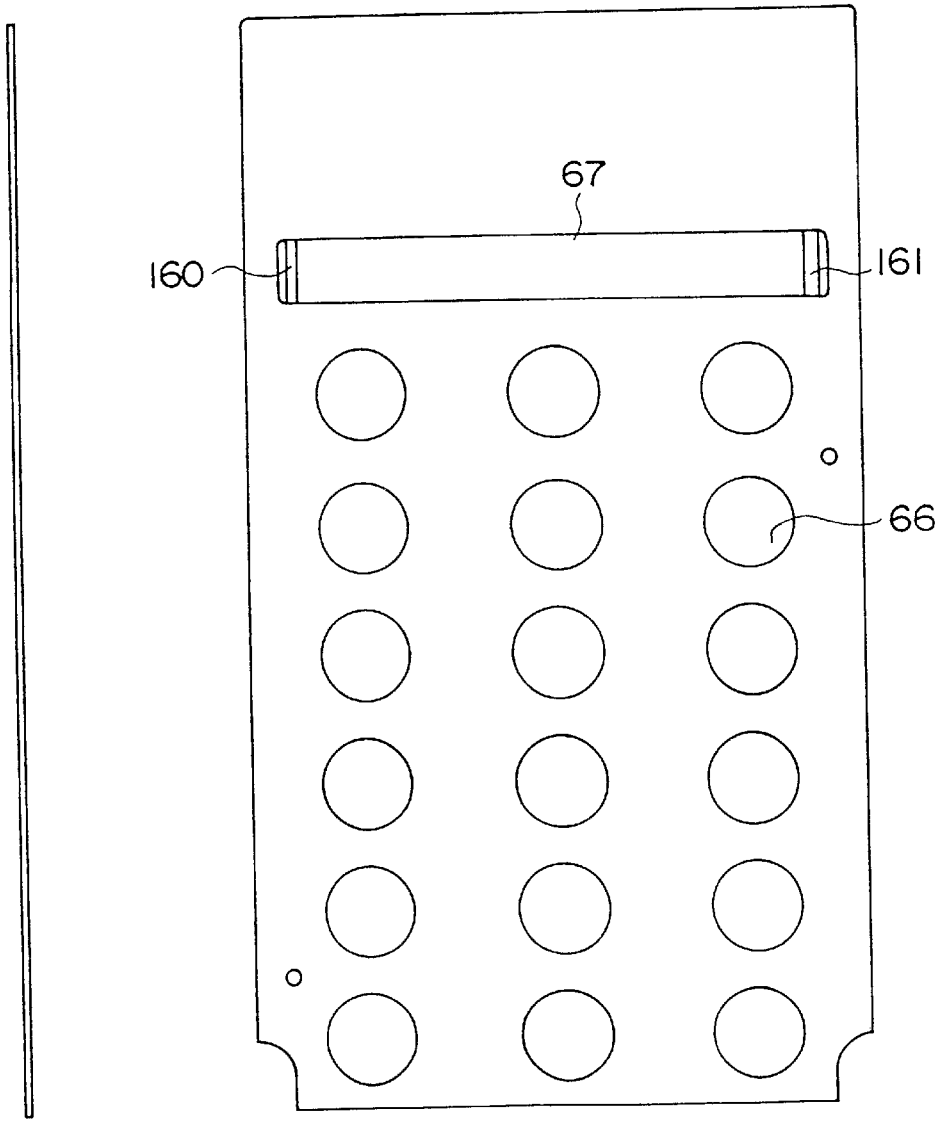
FIGS. 31A and 31B show a front view and a side elevational view of the sheet luminescent member, in a second variant example of the structure thereof in the above-mentioned embodiments of the present invention.

FIGS. 31A and 31B show a sheet luminescent member 44J in a second variant example of the sheet luminescent member 44 shown in FIGS. 9A and 9B. The sheet luminescent member 44J has terminals 160 and 161, which are drawn from electrodes of the sheet luminescent member 44J respectively. Each of the terminals 160 and 161 crosses a respective nearly extending-end portion of the slender opening 67 as shown in FIG. 31A, and thereby is exposed via the slender opening 67.

Figure 32:
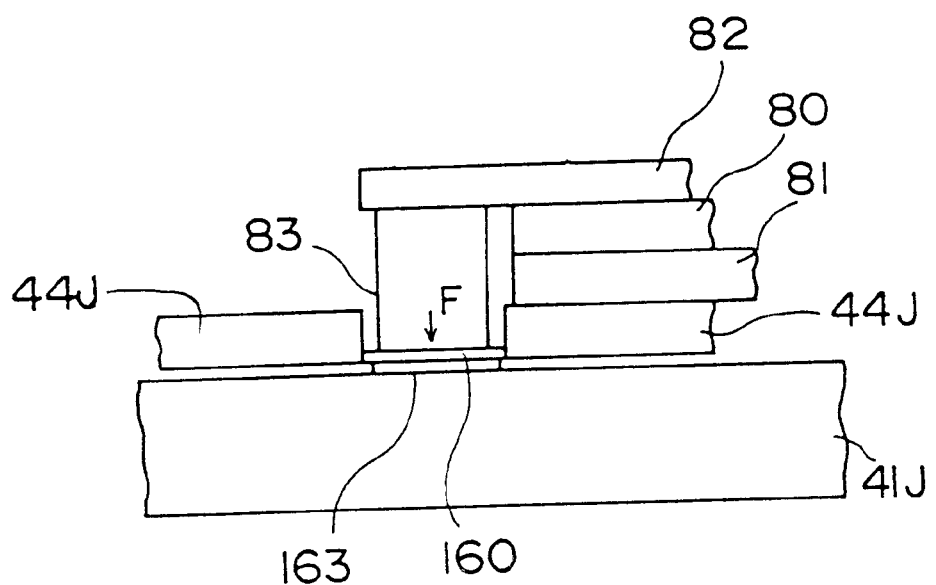
FIG. 32 shows a magnified partial elevational sectional view of the telephone body assembly using the sheet luminescent member shown in FIG. 31A, illustrating an electric connection between the sheet luminescent member and a front printed board.

As shown in FIG. 32, the rubber connector 83 shown in FIG. 5 is fitted into the slender opening 67, and thereby elastically presses each of the terminals 160 and 161, with an elastic force F, to a respective electric terminal pattern 163 provided on the front surface of a front printed board 41J. Thereby, each of the terminals 160 and 161 is in contact with the respective electric terminal pattern 163, and thus the sheet luminescent member 44J is electrically connected with the front printed board 41J. The rubber connector 83 is further used for electrically connecting the liquid crystal display assembly 48 to the front printed board 41J. The rubber connector 83 is provided originally for electrically connecting the liquid crystal display assembly 48 shown in FIG. 5 to the front printed board 41J.

Instead of using the slender opening 67 as described above, it is also possible to provide other openings in the sheet luminescent member 44J, which the terminals 160 and 161 cross, for electrically connecting the sheet luminescent member 44J with the front printed board 41J.

Further, application of the present invention is not limited to application to a portable telephone. It is also possible to apply the present invention to an ordinary telephone similarly.

The present invention is not limited to the above-described embodiments, and variations and modifications may be made without departing from the scope of the present invention.

What is claimed is:

1. A telephone, comprising:

a case having a front and a rear;

an operation part, having a front and a rear, being located in the front of said case, and having a plurality of keys arranged at the front of the operation part, each key having a light transmission property and a projection arranged on a rear surface of each key;

a liquid crystal display part exposed to the front of said case;

a circuit substrate, provided inside said case and having a sheet-luminescent-member driving circuit; and a sheet luminescent member, having a plurality of openings corresponding to the plurality of keys, standing portions facing two side surfaces of said liquid crystal display part and terminals electrically connected with said circuit substrate and activated via the projections, said sheet luminescent member being luminescent on a front surface thereof and also luminescent on surfaces of said standing portions facing said two side surfaces of said liquid crystal display part;

said sheet luminescent member being provided at the rear of said operation part, between said circuit substrate and the front of said case, where said standing portions face said two side surfaces of said liquid crystal display part, said terminals are electrically connected with said circuit substrate and each of said openings faces one of said projections respectively;

wherein:

light emitted by said sheet luminescent member is incident on each key from the rear surface thereof; and light emitted from said surfaces of said standing portions of said sheet luminescent member facing said two side surfaces of said liquid crystal display part is incident on said liquid crystal display part from said two side surfaces.

2. The telephone according to claim 1, wherein said sheet luminescent member integrally comprises a metal sheet on the rear surface thereof, said metal sheet having an electrical shielding function.

3. The telephone according to claim 1, wherein said sheet luminescent member comprises contact domes in said openings.

4. The telephone according to claim 1, wherein:

said sheet luminescent member comprises a metal sheet on the rear surface thereof, said metal sheet having an electrical shielding function; and said sheet luminescent member further comprises contact domes in said openings.

5. The telephone according to claim 1, wherein said sheet luminescent member integrally comprises a flexible printed substrate.

6. The telephone according to claim 1, wherein said sheet luminescent member comprises an arm having an electric terminal at an extending end thereof.

7. The telephone according to claim 1, wherein each of said openings exposes therethrough at least one of the terminals of said sheet luminescent member.

8. A device, comprising:

a case having a front portion and rear portion;

an operation part having a front portion and a rear portion, being located at the front portion of the case, having a plurality of key members on the front portion thereof, each key member having a front portion and a rear portion, being movable from a first on position to a second off position, and a light transmitting property from the rear portion of the key member to the front portion of the key member, having a circuit substrate including a sheet luminescent member driving circuit and a plurality of terminals corresponding to the plurality of key members, and having a sheet luminescent member located adjacent the rear portions of the plurality of key members, said sheet luminescent member having a plurality of openings corresponding to the plurality of key members, wherein a projection on a rear portion of each respective one of the key members extends through a respective one of the openings to selectively contact one of the plurality of terminals, when the key member is moved to the on position, and the sheet luminescent member otherwise underlies the rear portion of each key member, wherein, when the sheet luminescent member driving circuit is activated, the entire sheet luminescent member emits light, which light is incident on the rear portions of all of the plurality of key members, and diffuses from the rear portions to the front portions of all of the plurality of key members to uniformly light each key member.

9. The device as recited in claim 8, wherein said operation part further comprises a liquid crystal display part exposed to the front portion of the case, and wherein the light is incident on sides of said liquid crystal display part, and diffuses from the sides and out of a front portion of the liquid crystal display part.

10. The device according to claim 8, wherein said sheet luminescent member integrally comprises a metal sheet on a rear surface thereof, said metal sheet having an electrical shielding function.

11. The device according to claim 8, wherein a contact dome is disposed at each of said plurality of openings.

12. The device according to claim 8, wherein said sheet luminescent member integrally comprises a flexible printed substrate.

13. The device according to claim 8, wherein said sheet luminescent member comprises an arm having an electric terminal at an extending end thereof.

14. A device, comprising:

a case having a front portion and rear portion;

an operation part having a front portion and a rear portion, being located at the front portion of the case, and having a plurality of keys movable from a first on position to a second off position and having a light transmitting property from a rear portion of the key member to the front portion of the key member, and said operation part having a liquid crystal display part on the front portion thereof, said liquid crystal display portion having a front portion, a rear portion and sides, a circuit substrate including a sheet luminescent member driving circuit, a plurality of terminals corresponding to the key members, and a sheet luminescent member having standing portions located adjacent the sides of the liquid crystal display part, wherein said sheet luminescent member includes a plurality of openings corresponding to the plurality of key members, wherein a projection of each respective one of the key members extends through a respective one of the openings to selectively contact one of the plurality of terminals when the key member is moved to the on position and the sheet luminescent member otherwise underlies the rear portion of each key member, and wherein, when the sheet luminescent member driving circuit is activated, the entire sheet luminescent member, including the standing portions, emits light, which light from the standing portions is incident on sides of the liquid crystal display part, and diffuses from the sides to the front portion of the liquid crystal display part to light the liquid crystal display part.

15. The device according to claim 14, wherein said sheet luminescent member integrally comprises a metal sheet on a rear surface thereof, said metal sheet having an electrical shielding function.

16. The device according to claim 14, wherein a contact dome is disposed at each of said plurality of openings.

17. The device according to claim 14, wherein said sheet luminescent member integrally comprises a flexible printed substrate.

18. The device according to claim 14, wherein said sheet luminescent member comprises an arm having an electric terminal at an extending end thereof.

19. A telephone, comprising:

a case;

a liquid crystal display part exposed to the front side of said case and having sides;

an operation part being located in the case and having a plurality of key members movable from a first on position to a second off position, and a sheet-shaped luminescent member, having standing portions facing the sides of said liquid crystal display part, said sheet luminescent member being luminescent on surfaces of said standing portions facing said sides of said liquid crystal display part, wherein said sheet luminescent member includes a plurality of openings corresponding to the plurality of key members, wherein a projection of each respective one of the key members extends through a respective one of the openings, at least when the key member is moved to the on position, and the sheet luminescent member otherwise underlies each key member, wherein light emitted from said surfaces of said standing portions of said sheet luminescent member facing said sides of said liquid crystal display part is incident on said liquid crystal display part from said sides and diffuses from the sides to the front portion of the liquid crystal display part to light the liquid crystal display part.

* * * * *